US010602203B2

(12) United States Patent
Petajan et al.

(10) Patent No.: US 10,602,203 B2
(45) Date of Patent: Mar. 24, 2020

(54) ADAPTIVE BIT RATE MOBILE VIDEO OBJECTIVE TESTING

(71) Applicants: AT&T Mobility II LLC, Atlanta, GA (US); AT&T Intellectual Property I, L.P., Atlanta, GA (US)

(72) Inventors: Eric D. Petajan, Watchung, NJ (US); Emir Halepovic, Somerset, NJ (US); Subhabrata Sen, Westfield, NJ (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/429,907

(22) Filed: Jun. 3, 2019

(65) Prior Publication Data
US 2019/0289343 A1 Sep. 19, 2019

Related U.S. Application Data

(63) Continuation of application No. 15/647,588, filed on Jul. 12, 2017, now Pat. No. 10,313,717.

(51) Int. Cl.
*H04N 21/236* (2011.01)
*H04N 21/2343* (2011.01)
(Continued)

(52) U.S. Cl.
CPC ....... *H04N 21/23611* (2013.01); *G11B 27/34* (2013.01); *H04N 21/238* (2013.01);
(Continued)

(58) Field of Classification Search
USPC .......................................... 386/230, 239–248
See application file for complete search history.

(56) References Cited

U.S. PATENT DOCUMENTS 6,675,174 B1    1/2004 Bolle
9,319,289 B2    4/2016 MacInnis et al.
(Continued)

OTHER PUBLICATIONS

U.S. Office Action dated Jul. 19, 2018 in U.S. Appl. No. 15/647,588.
(Continued)

*Primary Examiner* — Hung Q Dang
(74) *Attorney, Agent, or Firm* — Hartman & Citrin LLC

(57) ABSTRACT

Concepts and technologies are disclosed herein for adaptive bit rate mobile video objective testing. A system can receive a plurality of screen-capture frames, where each of the plurality of screen-capture frames corresponds to a respective frame of an adaptive bit rate video stream being displayed on a screen of a test device. The system can create a screen-capture video stream and determine that the screen-capture video stream corresponds to a reference video stream that is non-annotated. The system can obtain a reference video signature package, align the screen-capture video stream with the reference video stream using the reference video signature package, generate full reference video quality performance indicators, and determine delivery quality performance indicators for the screen-capture video stream. The system can join the full reference video quality performance indicators and the delivery quality performance indicators to form an objective quality of experience data structure.

20 Claims, 10 Drawing Sheets

(51) Int. Cl.
  *H04N 21/238* (2011.01)
  *G11B 27/34* (2006.01)
(52) U.S. Cl.
  CPC ............... *H04N 21/234363* (2013.01); *H04N 21/234381* (2013.01)

(56) References Cited

U.S. PATENT DOCUMENTS

| | | |
|---|---|---|
| 9,350,990 B2 | 5/2016 | Orton-Jay et al. |
| 9,386,067 B2 | 7/2016 | Bulava et al. |
| 9,615,115 B2 | 4/2017 | Mick, Jr. et al. |
| 2013/0096904 A1 | 4/2013 | Hui |
| 2015/0089076 A1 | 3/2015 | Reza |
| 2015/0189344 A1 | 7/2015 | Amidei |
| 2015/0289013 A1 | 10/2015 | Nelson |
| 2016/0080237 A1 | 3/2016 | Halepovic et al. |
| 2016/0088322 A1 | 3/2016 | Horev et al. |
| 2016/0261879 A1 | 9/2016 | Orton-Jay et al. |
| 2016/0294898 A1 | 10/2016 | Wheelock |
| 2016/0301726 A1 | 10/2016 | Bulava et al. |
| 2016/0337426 A1 | 11/2016 | Shribman et al. |
| 2017/0055012 A1 | 2/2017 | Phillips et al. |
| 2017/0078348 A1 | 3/2017 | McGinnity et al. |
| 2017/0085616 A1 | 3/2017 | Botsford et al. |
| 2017/0094359 A1 | 3/2017 | Basra |
| 2017/0249521 A1* | 8/2017 | Brice .................. G06K 9/036 |
| 2017/0262346 A1 | 9/2017 | Pradhan |

OTHER PUBLICATIONS

U.S. Notice of Allowance dated Jan. 15, 2019 in U.S. Appl. No. 15/647,588.

* cited by examiner

ADAPTIVE BIT RATE MOBILE VIDEO OBJECTIVE TESTING

CROSS-REFERENCE TO RELATED APPLICATIONS

This application is a continuation of and claims priority to U.S. patent application Ser. No. 15/647,588, entitled "Adaptive Bit Rate Mobile Video Objective Testing," filed Jul. 12, 2017, now U.S. Pat. No. 10,313,717, which is incorporated herein by reference in its entirety.

BACKGROUND

The delivery of streaming video over communication networks can be both commercially important and expensive to support. Adaptive bit rate (ABR) video streaming can be designed to maintain continuous streaming service over congested networks. An example of maintaining continuous streaming service can be provided by a client player having the ability to select from a set of quality levels within a video stream, and the selection can be based on bandwidth history, network traffic, and/or local memory and processor availability. As ABR video streaming becomes more prevalent, the technical challenges for streaming service providers to provide consistent performance and prompt delivery may continue to increase. A user may provide subjective feedback as to the quality of experience for ABR delivery on a communication network; however, streaming service providers may not be privy to externalities affecting the subjective feedback from the user. As such, if streaming service providers rely solely on subjective feedback, then technical issues with streaming services could lay dormant and continue to persist despite positive subjective feedback from users.

SUMMARY

The present disclosure is directed to systems and methods for adaptive bit rate mobile video objective testing. As used herein, the phrase "ABR mobile video objective testing" or "objective testing" is used to refer to repeatable, quantitative performance analysis and measurement of end-to-end video quality and delivery quality of one or more ABR streaming services in a controlled environment. As used herein, the phrase "ABR streaming service" refers to the use of a system that can deliver an ABR video stream over a network to a device, such as a test device, while allowing the test device to dynamically switch between different levels of video quality based on resource capacity, such as network congestion, processor utilization, and/or memory capacity. The phrase "ABR video stream" refers to a video file having multiple tracks of the same video content, with each track corresponding to a different level of video quality due to each track being encoded at a different bitrate. As used herein, the term "track" refers to a rendition of video content from a source video that has been encoded at a bitrate, a resolution, and/or a frame rate to provide video data and audio data with a specific level of video quality. The term "tracks" refers to more than one track of video content encoded from the source video, where each track corresponds to a different level of video quality due to each track being encoded at a different bitrate. According to various concepts and technologies disclosed herein, adaptive bit rate mobile video objective testing (also referred to here as "objective testing") can be operable via the use of a non-generic computer system, such as a video processing server computer, that can obtain information about an adaptive bit rate video stream playing on a test device (e.g., executing and being displayed on a screen of a test device). As used herein, the phrase "test device" is used to refer to a non-generic computing device that is operable to play and present audio and/or video from an adaptive bit rate video stream. In some embodiments, adaptive bit rate mobile video objective testing can occur in parallel on multiple test devices. These and other aspects of the concepts and technologies disclosed herein will be illustrated and described in more detail below.

According to one aspect of the concepts and technologies disclosed herein, a system for adaptive bit rate mobile video objective testing is disclosed. The system can include a processor and a memory. The memory can store computer-executable instructions that, in response to being executed by the processor, cause the processor to perform operations. The operations can include receiving a plurality of screen-capture frames, where each of the plurality of screen-capture frames corresponds to a respective frame of an adaptive bit rate video stream being displayed on a screen of a test device. The operations can include creating a screen-capture video stream that includes the plurality of screen-capture frames. The operations further can include determining that the screen-capture video stream corresponds to a reference video stream. The reference video stream can be non-annotated. The operations further can include obtaining a reference video signature package that is associated with the reference video stream. The operations further can include aligning the screen-capture video stream with the reference video stream using the reference video signature package. The operations further can include generating full reference video quality performance indicators for the screen-capture video stream based on the reference video signature package. The operations further can include determining delivery quality performance indicators for the screen-capture video stream based on the reference video signature package; and joining the full reference video quality performance indicators and the delivery quality performance indicators to form an objective quality of experience data structure.

In some embodiments, the full reference video quality performance indicators can include a spatial resolution indicator, a frame rate indicator, a compression artifacts indicator, a pixel depth indicator, or any combination thereof. In some embodiments, the delivery quality performance indicators can include a video startup time indicator, a video stall indicator, a rate switching indicator, a latency indicator, or any combination thereof.

In some embodiments, aligning the screen-capture video stream with the reference video stream using the reference video signature package can occur without obtaining the reference video stream during performance of the alignment. In some embodiments, aligning the screen-capture video stream with the reference video stream using the reference video signature package can include isolating a screen-capture frame of the screen-capture video stream; generating a binary pixel image for the screen-capture frame; creating a screen-capture string based on the binary pixel image, where the screen-capture string can correspond to the screen-capture frame. In some embodiments, a screen-capture string can be created for each binary pixel image. In some embodiments, the screen capture string corresponds to more than one screen-capture frame of the screen-capture video stream. In some embodiments, aligning the screen-capture video stream with the reference video stream using the reference video signature package further can include obtaining a reference video string from the reference video signature package; generating a pixel difference string based on a comparison between the screen-capture string and the reference video string; determining a pixel distance value based on the pixel difference string, and assigning the screen-capture frame of the screen-capture video stream to a frame of the reference video stream based on the pixel distance value. In some embodiments, assigning the screen-capture frame of the screen-capture video stream can align the screen-capture video stream with the reference video stream. In some embodiments, generating the binary pixel image can be in response to a determination that pixel value distortion exists between the screen-capture video stream and the reference video stream.

In some embodiments, a screen-capture video stream can include a plurality of tracks. Each of the plurality of tracks from the screen-capture video stream can include audio data, and video data that corresponds with a quality level. In some embodiments, the operations further include routing the adaptive bit rate video stream through a bandwidth modulation proxy that can emulate congestion on a network. In some embodiments, the adaptive bit rate video stream can be captured from the screen of the test device after being routed through the bandwidth modulation proxy.

According to another aspect, a method for adaptive bit rate mobile video objective testing is disclosed. The method can include receiving, at a system comprising a processor, a plurality of screen-capture frames, where each of the plurality of screen-capture frames corresponds to a respective frame of an adaptive bit rate video stream being displayed on a screen of a test device. The method also can include creating a screen-capture video stream that includes the plurality of screen-capture frames. The method also can include determining, by the processor, that the screen-capture video stream corresponds to a reference video stream that is non-annotated. The method also can include obtaining, by the processor, a reference video signature package that is associated with the reference video stream; aligning, by the processor, the screen-capture video stream with the reference video stream using the reference video signature package; generating, by the processor, full reference video quality performance indicators for the screen-capture video stream based on the reference video signature package; determining, by the processor, delivery quality performance indicators for the screen-capture video stream based on the reference video signature package; and joining, by the processor, the full reference video quality performance indicators and the delivery quality performance indicators to form an objective quality of experience data structure.

In some embodiments, the method also can include routing, by the processor, the adaptive bit rate video stream through a bandwidth modulation proxy that emulates congestion on a network. The adaptive bit rate video stream can be captured from the screen of a test device after being routed through the bandwidth modulation proxy. In some embodiments, the screen-capture video stream can include a plurality of tracks. Each of the plurality of tracks can include audio data and video data that corresponds with a quality level. In some embodiments, the full reference video quality performance indicators can include a spatial resolution indicator, a frame rate indicator, a compression artifacts indicator, a pixel depth indicator, or any combination thereof. In some embodiments, the delivery quality performance indicators can include a video startup time indicator, a video stall indicator, a rate switching indicator, a latency indicator, or any combination thereof.

In some embodiments, aligning the screen-capture video stream with the reference video stream using the reference video signature package can occur without obtaining the reference video stream during performance of aligning. In some embodiments, aligning the screen-capture video stream with the reference video stream using the reference video signature package can include isolating, by the processor, a screen-capture frame of the screen-capture video stream; generating, by the processor, a binary pixel image for the screen-capture frame; and creating, by the processor, a screen-capture string based on the binary pixel image. The screen capture string can correspond to the screen-capture frame. Aligning the screen-capture video stream with the reference video stream using the reference video signature package further can include obtaining, by the processor, a reference video string from the reference video signature package; generating, by the processor, a pixel difference string based on a comparison between the screen-capture string and the reference video string; determining, by the processor, a pixel distance value based on the pixel difference string; and assigning, by the processor, the screen-capture frame of the screen-capture video stream to a frame of the reference video stream based on the pixel distance value. In some embodiments, assigning the screen-capture frame of the screen-capture video stream can align the screen-capture video stream with the reference video stream. In some embodiments, generating the binary pixel image is in response to a determination that pixel value distortion exists between the screen-capture video stream and the reference video stream.

According to yet another aspect of the concepts and technologies disclosed herein, a computer storage medium is disclosed. The computer storage medium can store computer-executable instructions that, in response to being executed by a processor, cause the processor to perform operations. The operations can include receiving a plurality of screen-capture frames, where each of the plurality of screen-capture frames corresponds to a respective frame of an adaptive bit rate video stream being displayed on a screen of a test device. The operations further can include creating a screen-capture video stream that includes the plurality of screen-capture frames. The operations further can include determining that the screen-capture video stream corresponds to a reference video stream that is non-annotated; obtaining a reference video signature package that is associated with the reference video stream; aligning the screen-capture video stream with the reference video stream using the reference video signature package; generating full reference video quality performance indicators for the screen-capture video stream based on the reference video signature package; determining delivery quality performance indicators for the screen-capture video stream based on the reference video signature package; and joining the full reference video quality performance indicators and the delivery quality performance indicators to form an objective quality of experience data structure.

In some embodiments, the operations further can include routing the adaptive bit rate video stream through a bandwidth modulation proxy that can emulate congestion on a network. The adaptive bit rate video stream can be captured from the screen of a test device after being routed through the bandwidth modulation proxy. In some embodiments, the full reference video quality performance indicators can include a spatial resolution indicator, a frame rate indicator, a compression artifacts indicator, a pixel depth indicator, or any combination thereof. In some embodiments, the delivery quality performance indicators can include a video startup time indicator, a video stall indicator, a rate switching indicator, a latency indicator; or any combination thereof.

In some embodiments, aligning the screen-capture video stream with the reference video stream using the reference video signature package can occur without obtaining the reference video stream during the performance of aligning. In some embodiments, aligning the screen-capture video stream with the reference video stream using the reference video signature package can include isolating a screen-capture frame of the screen-capture video stream; generating a binary pixel image for each the screen-capture frame; and creating a screen-capture string based on the binary pixel image. The screen capture string can correspond to the screen-capture frame. Aligning the screen-capture video stream with the reference video stream using the reference video signature package further can include obtaining a reference video string from the reference video signature package; generating a pixel difference string based on a comparison between the screen-capture string and the reference video string; determining a pixel distance value based on the pixel difference string; and assigning the screen-capture frame of the screen-capture video stream to a frame of the reference video stream based on the pixel distance value. In some embodiments, assigning the screen-capture frame of the screen-capture video stream can align the screen-capture video stream with the reference video stream. In some embodiments, generating the binary pixel image can be in response to determination that pixel value distortion exists between the screen-capture video stream and the reference video stream.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1A:
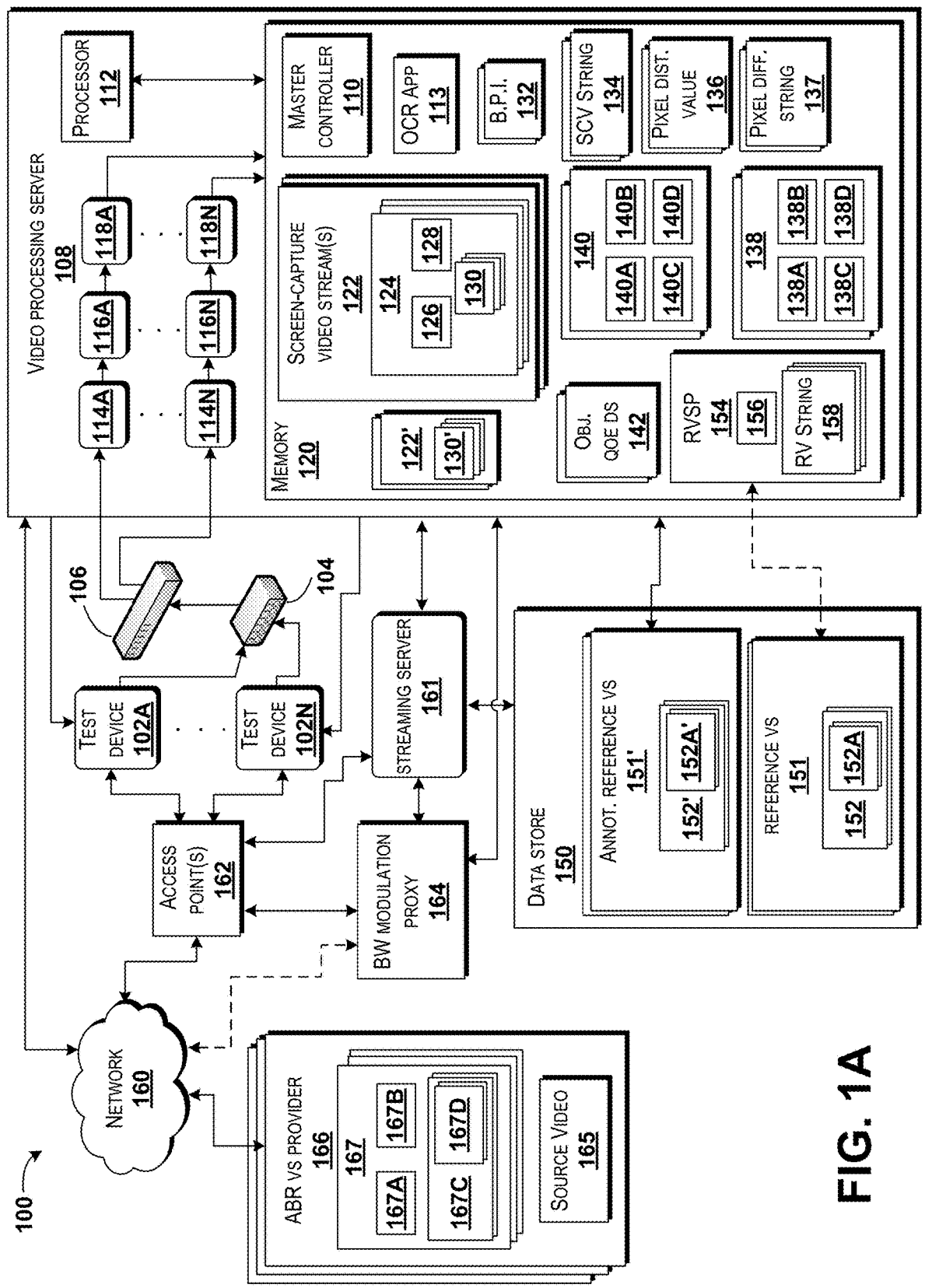
FIG. 1A is a block diagram illustrating a system for adaptive bit rate mobile video objective testing, according to various example embodiments of the concepts and technologies described herein.

The following detailed description is directed to adaptive bit rate mobile video objective testing. Conventional delivery mechanisms for mobile video have used a single high-quality video stream to provide content to an end user. However, single high-quality video streams can be an inefficient use of network resources and may increase network traffic and congestion. This can be because the single high-quality video streams deliver high video quality irrespective of the available bandwidth or other communications traversing the network. Comparatively, the use of ABR video streams on a network with limited resources (e.g., limited amount of processor, memory, and communication channels) can allow a more consistent delivery of content by varying the video quality based on the network resources available for delivery to a test device that plays the ABR video stream. A measure for how efficiently an ABR video stream is delivered and for the quality in which the ABR stream is being presented on the screen of a device can be referred to as a "Quality of Experience" (QoE). If the video quality of an ABR video stream is too high (e.g., maximum spatial resolution, frame rate, etc.), then delivery quality may suffer (e.g., increased video startup time, frequency and duration of stalls during playback to allow for buffering, etc.). As such, network service providers that provide and/or facilitate delivery of ABR video streams seek to balance video quality with delivery quality, thereby mitigating waste of network resources while maintaining a QoE that is acceptable to the user.

As ABR video streaming is becoming more prevalent, content providers may seek to ensure that the actual ABR video stream experienced by the user (e.g., via playback of the ABR video stream on a mobile device) aligns with the expectations of the content provider. Network service providers may desire to monitor QoE of ABR video streams delivered on their network in order to give the ABR video stream provider feedback that could result in video performance improvements and/or reduced network load. However, typical testing of ABR video streams to determine QoE has relied on subjective metrics from users (e.g., via mean opinion scores) and/or analysis only of network traffic which requires manual sifting of packet traces. Moreover, if the network traffic delivering the ABR video stream is encrypted, attempts to ascertain details as to playback performance and QoE on a user device by only monitoring the network traffic may be difficult, if not impossible. Conventional testing to measure QoE of ABR video streams have been categorized into three classes, full reference (FR), reduced-reference (RR), and no-reference (NR). As mentioned above, subjective testing relies on feedback from human observers watching an ABR video stream as it is played back to provide quantifiable assessment (e.g., mean opinion scores). Although conventional testing using conventional FR analysis is more accurate than conventional RR analysis, and both conventional FR and RR analysis is more accurate than conventional testing using NR analysis, the conventional FR and RR analysis may be difficult or impossible at some testing locations. As such, conventional testing may have provided varied results that are not easily repeatable or automated.

Conventional FR and RR analysis has conventionally required obtaining a source video from which the ABR video stream was encoded, and/or obtaining a reference video stream to use as a baseline for QoE analysis. As used herein, the phrase "source video" refers to original video content that can be configured as a video content file with video data and audio data. The source video can be the source of video content from which an ABR video stream and/or a reference video stream is generated. As used herein the phrase "reference video stream" refers to a duplicate, undistorted, and/or corrected version or copy of the ABR video stream in its entirety, including all tracks and data contained therein, prior to delivery to a device, such as a test device. In some embodiments, the reference video stream may be a version of an ABR video stream that has had color correction, enhanced resolution, and/or noise removed from the tracks contained therein. Conventionally, a FR analysis needed a complete copy of the reference video stream and/or source video to use for comparisons, and in the case of RR analysis, at least a partial copy of the source video and/or reference video stream was needed. In turn, this meant that conventional analysis may have required the retrieval or acquisition of the reference video stream before and/or during tests in order for conventional analysis to be completed. However, in many situations, the source video and/or reference video stream can be inaccessible, or practically impossible, to obtain due to access restrictions, file size, and/or the time and processing resources involved in acquiring the reference video stream for multiple testing instances. However, even if the reference video stream could be obtained by a computer system for testing purposes, the limited amount of network resources available at a testing site may render delivery of the source video and/or reference video stream impractical because the file size of the reference video stream and resources consumed during delivery could cause or contribute to network congestion. When one or more instance of testing requires obtaining the reference video stream as a prerequisite, testing of one or more ABR video streams, whether sequentially or in parallel, can become impractical. Moreover, some locations in which testing occurs may not have access to a local copy of the reference video stream. Thus, conventional techniques for objective testing would be limited due to the reference video stream being impractical and/or inaccessible to obtain.

The concepts and technologies described herein are provided to address technical challenges that can arise from ABR video streaming over a network that may experience congestion due to a finite amount of bandwidth available at a given time. Embodiments of the present disclosure can allow for full reference and/or reduced reference objective testing of adaptive bit rate mobile video streams without requiring the retrieval of a reference video stream to provide measurements pertaining to QoE. Specifically, aspects of the present disclosure can provide testing that can control network conditions and use a reference video signature package associated with a non-annotated reference video stream in order to determine video quality and temporal alignment without retrieving the reference video stream. As discussed with respect to the various embodiments presented herein, the present disclosure discusses aspects that can provide repeated, controlled objective testing that generates metrics which can result in performance playback improvements and reduce the load on a communication network. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1A, an illustrative embodiment of system 100 will be described herein for ABR mobile video objective testing, according to various embodiments of the concepts and technologies disclosed herein. The system 100 shown in FIG. 1A is illustrated as including test devices 102A-102N (which, for clarity, will be referred to in the collective as "test device 102"), a converter 104, a switch 106, a video processing server 108, a data store 150, an ABR video stream provider 166, a communications network ("network") 160, an access point 162, a streaming server 161, and a bandwidth modulation proxy 164. It must be understood that although the system 100 shows two test devices 102A and 102N, one converter 104, one switch 106, one video processing server 108, one data store 150, one ABR video stream provider 166, one network 160, one access point 162, one streaming server 161, and one bandwidth modulation proxy 164, various embodiments of the concepts and technologies disclosed herein include versions of the system 100 having almost any number of the test devices 102, the converters 104, the switches 106, the video processing servers 108, the data stores 150, the ABR video stream providers 166, the networks 160, the access points 162, the streaming servers 161, and the bandwidth modulation proxies 164, where the number of each includes zero, one, tens, hundreds, thousands, or even more. As such, the illustrated embodiment must be understood as being illustrative and should not be construed as being limiting in any way. The video processing server 108, the test device 102, the streaming server 161, the bandwidth modulation proxy 164, the access point 162, the converter 104, the switch 106, and the data store 150 can operate in communication with each other and/or as a part of the network 160. Additional details of the network 160 are illustrated and described below with reference to FIG. 4.

According to various embodiments, the functionality of the video processing server 108 may be provided by one or more web servers, desktop computers, other computing systems, and the like. It should be understood that the functionality of the video processing server 108 can be provided by a single device, by two similar devices, and/or by two or more dissimilar devices. For example, the functionality of the video processing server 108 can be provided by multiple servers in a server farm or other cloud computing platform, if desired. For purposes of describing the concepts and technologies disclosed herein, the video processing server 108 is described herein as a single device. An embodiment of the video processing server 108 can be a computer system 500, which is discussed in further detail with respect to FIG. 5. Based on the above, however, it should be understood that the described embodiment is illustrative, and therefore should not be construed as being limiting in any way.

According to various embodiments, the ABR video stream provider 166 can be a source for providing an ABR video stream 167. Examples of the ABR video stream provider 166 include, but is not limited to, video stream platforms from YOUTUBE INC., NETFLIX STREAMING SERVICES INC., AMAZON (dot) COM INC., HULU LLC, or other providers that provide ABR video streams for playback on devices, such as the test device 102. It is understood that the ABR video stream provider 166 can include computer systems and memory storage devices that store files for the ABR video stream 167 and that can communicate the ABR video stream 167 through the network 160 and the access point 162 to one or more of the test device 102. One or more of the access point 162 can be wired and/or wireless and can include a base station, a wireless router, a femtocell, or other network nodes that can facilitate communication between the test device 102 and the network 160. In some embodiments, the ABR video stream provider 166 can store a source video 165 on a storage device, such as the memory of a computer system. The source video 165 includes the original video content as a video content file with video data and audio data. The source video 165 can be provided to the ABR video stream provider 166 to use for generation of the ABR video stream 167. In some embodiments, the source video 165 corresponds with the maximum level of video quality with which the video content can be played, such as due to having a resolution, a bitrate, and/or a frame rate that is at least equal to the highest resolution, bitrate, and/or frame rate reflected in video streams, such as the ABR video stream 167 and/or reference video stream 151, which will be discussed in detail below. In some embodiments, the ABR video stream 167 can be created or otherwise generated by a computer system of the ABR video streaming provider 166 based on the source video 165. For example, the ABR video stream provider 166 can execute an application, such as a transcoder and/or encoder, that encodes video content from the source video 165 into one or more tracks 167C so that each of the tracks 167C has the same video content as the source video 165; however, each of the tracks 167C corresponds to a different level of video quality due to each of the tracks 167C being encoded at a different bitrate. Each of the tracks 167C of the ABR video stream 167 can have frames 167D that can be presented or otherwise displayed on a screen of a device, such as a screen of the test device 102. Each of the frames 167D can provide a visual image with a level of video quality corresponding to one of the tracks 167C. When the ABR video stream 167 is being delivered to the test device 102, a different amount of the frames 167D from each track 167C can be provided in segments to the test device 102 according to a time indicator. The test device 102 can assemble the frames 167D of different video quality according to the time indicator thereby allowing for the presentation of video content at various levels of video quality (e.g., different resolutions, frame rates, etc.) due to switches between the tracks 167C. Switching between the tracks 167C can be based on the network connection or other constraining factors that may affect delivery or playing of the ABR video stream 167 (e.g., the capability of the network connection, load on a processor of the test device 102, and/or other constraining factors that may affect delivery).

In some embodiments, aspects of objective testing can include the ABR video stream 167 being streamed or otherwise delivered to one or more of the test device 102 via the network 160, one or more of the access point 162, and/or a streaming server, such as the streaming server 161. In embodiments, the streaming server 161 can be local to where the objective testing is occurring, such as via direct communication with one or more of the access point 162. In other embodiments, the ABR video stream provider 166 can include a remotely located (i.e., not at the location where the objective testing is taking place with the test device 102) server that can facilitate delivery of ABR video stream 167 via the network 160, thereby allowing for objective testing to occur at a location remote from the ABR video stream provider 166. The objective testing can include more than one of the test device 102 each playing one or more of the frames 167D from the tracks 167C of the ABR video streams 167, and thus multiple instances of objective testing can be conducted in parallel on the test devices 102. In some embodiments where multiple test devices 102 are tested, each test device 102 can obtain and/or otherwise receive the same ABR video stream 167. In various embodiments, the video processing server 108 can initiate objective testing on behalf of the test device 102, such as by the video processing server 108 executing software, such as a master controller 110, that directs the test device 102 to make a request to receive the ABR video stream 167 from the ABR video stream provider 166 via the network 160 and the access point 162, such as by using wireless communication links. In some embodiments, a wired communication link can facilitate delivery of the ABR video stream 167 from the access point 162 to the test device 102. In another embodiment, the video processing server 108 can initiate objective testing by obtaining the ABR video stream 167 from the ABR video stream provider 166 via the network 160 and then using the streaming server 161 that is local to the objective testing site to provide the ABR video stream 167 to the one or more test devices 102 instead of the test device 102 receiving the ABR video stream 167 directly via the network 160 from the ABR video stream provider 166 that can provide the ABR video stream 167 from a remote location.

In some embodiments, to request or otherwise obtain the ABR video stream 167, the test device 102 can obtain (e.g., download) a manifest 167A and/or a playlist 167B contained in the ABR video stream 167 from the computer system storing the ABR video stream 167, such as a computer system of the ABR video stream provider 166. The manifest 167A can indicate a track number and/or bitrate corresponding to each of the tracks 167C. The playlist 167B can include one or more uniform resource locator (URL) that points or otherwise indicates the segments of video data and audio data for the frames 167D to be played according to a specific time. The manifest 167A and the playlist 167B can allow the test device 102 to select and/or request one or more segments of video data and audio data from the track 167C which have the frames 167D corresponding to a level of video quality that can be reflected on the test device 102 during execution of the ABR video stream 167. As the test device 102 experiences different network conditions, such as network congestion and/or decreased processor availability, the test device 102 can switch the level of video quality by presenting frames 167D from a different one of the tracks 167C. The ABR video stream 167 can be delivered to the test device 102 in segments of video data and/or audio data that include the frames 167D corresponding to one of the tracks 167C, and the segments can be packaged for delivery in the format of one or more transport files within one or more transport streams, such as a transport stream file having an MPEG Layer-4 file (MP4) format and a transport stream having a Moving Picture Experts Group-2 (MPEG-2) format.

In some embodiments, delivery of the ABR video stream 167 to the test device 102 may traverse the network 160. The network 160 can, in some embodiments, have congestion due to factors that may not be controlled by the video processing server 108. In some instances, objective testing under specific network conditions can be beneficial in obtaining results that reflect the operating environment in which devices experience while playing an ABR video stream, such as the ABR video stream 167. As such, the video processing server 108 can create a controlled environment for objective testing by using a bandwidth modulation proxy, such as the bandwidth modulation proxy 164. In some embodiments, the video processing server 108 can execute the master controller 110 that activates the bandwidth modulation proxy 164. In some embodiments, the bandwidth modulation proxy 164 can intercept or otherwise reroute the ABR video stream 167 through the bandwidth modulation proxy 164 before reaching the test device 102. As used herein, the phrase "bandwidth modulation proxy" is used to refer to a server and/or service executing on a server that can emulate congestion on a network, such as the bandwidth modulation proxy 164 on the network 160. For example, if the master controller 110 executing on the video processing server 108 determines that the network 160 is not congested (e.g., due to available bandwidth) and/or is not representative of certain network constraints (e.g., peak network traffic that remains below a maximum capacity), the bandwidth modulation proxy 164 can be used to simulate network congestion and/or other network constraints that would be experienced by the test device 102 and that would impact delivery of a video stream (e.g., ABR video stream 167). This allows the test device 102 to receive or otherwise obtain an ABR video stream, such as the ABR video stream 167, under dynamic "real world conditions" (e.g., when congestion exists on the network 160) while objective testing is underway. The bandwidth modulation proxy 164 may be used to establish a consistent testing environment so that testing campaigns can provide repeatable test conditions that are representative of "real world conditions" so that measurements can be repeated and QoE data can be generated while accurately reflecting network experiences of user devices operating outside of the test environment, such as mobile communication devices operating on a wireless network of a network provider. In some embodiments, the bandwidth modulation proxy 164 can create the controlled environment via implementation of a hypertext transfer protocol (HTTP) proxy-based approach, which includes using HTTP traffic to deliver the ABR video stream 167 to one or more of the test devices 102.

In some embodiments of the present disclosure, the bandwidth modulation proxy 164 can include an HTTP proxy server that can be on a physical or virtual computer system. In some embodiments, the test device 102 is configured to specify that the bandwidth modulation proxy 164 is to be used to mediate HTTP traffic between the test device 102 and the ABR video stream provider 166 and/or the streaming server 161. The bandwidth modulation proxy 164 can redirect network traffic carrying the ABR video stream 167 from the network 160 through the streaming server 161 so as to simulate network congestion before the ABR video stream 167 is received by the test device 102. In some embodiments, the streaming server 161 can provide a virtual private network that can enable redirection and/or rerouting of the ABR video stream 167. In some embodiments, the test device 102 can store an access point name (APN) configuration and/or a settings profile that identifies the bandwidth modulation proxy 164 and/or specifies that the bandwidth modulation proxy 164 should be used during testing. In some embodiments, the master controller 110 executing on the video processing server 108 can direct the bandwidth modulation proxy 164 to emulate network congestion based on the master controller 110 detecting whether the APN configuration and/or the settings profile is stored on the test device 102, and if so, implementing the APN configuration and/or the settings profile to activate the bandwidth modulation proxy 164.

In some embodiments, a proxy software executing on the bandwidth modulation proxy 164 can be used to pass HTTP requests and responses between the test device 102 and a server, such as the ABR video stream provider 166 and/or the streaming server 161. In some embodiments, the proxy software, also referred to as a bandwidth shaping tool, can control the data rate available in each direction for the specified test device 102. This control of the data rate can be accomplished based on the IP address, the MAC address, or other network features identified by the bandwidth modulation proxy 164. In some embodiments, the bandwidth modulation proxy 164 can store a bandwidth shaping profile that indicates or otherwise defines one or more constraining factors for the bandwidth shaping tool to use in emulating network congestion. The bandwidth shaping profile can be loaded into the memory of the bandwidth modulation proxy 164 prior to initiation of the objective test and/or be referenced during objective test execution. The constraining factors defined in the bandwidth shaping profile can create a consistent data rate and/or bandwidth variation over time while the objective test occurs. The bandwidth shaping profile can be implemented by the bandwidth modulation proxy 164 at the same time as a test video, such as the ABR video stream 167, is being played on the test device 102, which in turn can allow the same conditions to be observed or otherwise experienced by the test device 102 over a repeated number of objective tests.

The bandwidth shaping profile can be based on real-world measurements from the live network 160 and/or the constraining factors in the bandwidth shaping profile can be synthetically created with specific intent to create certain conditions that are required for testing (e.g., a sudden drop in data rate available to the test device as a consequence of network congestion). An example of a constraining factor contained in the bandwidth shaping profile can include specifying a data rate value that can emulate network congestion that can be measured, identified, and/or determined by the master controller 110 of the video processing server 108. Another example of a constraining factor can include a noise value that indicates an amount of wireless signal interference and/or noise that is to be produced by the bandwidth modulation proxy 164 so as to affect wireless delivery of the ABR video stream 167 to the test device 102. The noise value may cause the bandwidth modulation proxy 164 to create and/or increase the wireless signal noise on a wireless channel used by the test device 102 and/or decrease the wireless signal strength that is relied on by the test device 102 to receive the ABR video stream 167. The bandwidth shaping profile can define the granularity in which the constraining factors are implemented, such as the data rate value and/or the noise value being changed with fine granularity (e.g., sub-second changes) or coarse granularity (e.g., multiple seconds between changes). It is understood that the examples of constraining factors discussed above are provided for illustration purposes only, and should not be interpreted as limiting in any way.

When a test device, such as the test device 102, is a mobile communication device, such as a smartphone, emulation of network congestion via use of a bandwidth shaping profile on the bandwidth modulation proxy 164 can be applied (e.g., via execution of a processor) when the test device 102 is receiving an ABR video stream, such as the ABR video stream 167, over a wireless connection, such as a Wi-Fi and/or cellular connection. In some embodiments, the bandwidth shaping profile is applied by the bandwidth modulation proxy 164 while the test device 102 uses an isolated high-speed wireless connection, such as an embodiment where the streaming server 161 provides the ABR video stream 167 to the access point 162 via the bandwidth modulation proxy 164 instead of directly from the ABR video stream provider 166. This can ensure that a controlled environment for objective testing is created due to the bandwidth modulation proxy 164 controlling the network traffic via the bandwidth shaping profile, thereby ensuring that the bandwidth modulation proxy 164 is controlling at least some, if not all, constraints on the wireless connections used while performing the objective testing. In some embodiments, the bandwidth modulation proxy 164 can retain a constraint log of all HTTP requests, packet traces, and changes to a bandwidth profile over time, thereby showing what network constraints were placed on the test devices 102 while objective testing occurred. The constraint log can be appended to an objective QoE data structure 142, which will be discussed in further detail below.

In some embodiments, the streaming server 161 can execute (e.g., host) the ABR video stream 167 for the ABR video stream provider 166, and thus can facilitate delivery of the ABR video stream 167 to one or more of the test device 102. In some embodiments, the streaming server 161 may be remotely located from the test device 102 and deliver the ABR video stream 167 to the test device 102 via the access point 162 using an internet connection with the network 160. In some embodiments, the streaming server 161 may be local to the test device 102 (e.g., co-located and/or communicatively coupled to a local area network) such that the ABR video stream 167 is provided to the test device 102 through an intranet connection, directly or via a local area network connection of the network 160. In some embodiments, objective testing can include the video processing server 108 using the streaming server 161 to provide the ABR video stream 167 to the test device 102 instead of the test device 102 receiving the ABR video stream 167 directly from the ABR video stream provider 166 via the network 160. In some embodiments, the streaming server 161 is not present or otherwise available for use, yet objective testing can still occur by the ABR video stream 167 being provided to the test device 102 from the ABR video stream provider 166 via the network 160. In instances where the streaming server 161 is not present or available for use in objective testing, the bandwidth modulation proxy 164 can still be used in objective testing, and the bandwidth modulation proxy 164 may be able to communicate with the access point 162 directly instead of communicating via the streaming server 161.

Figure 1B:
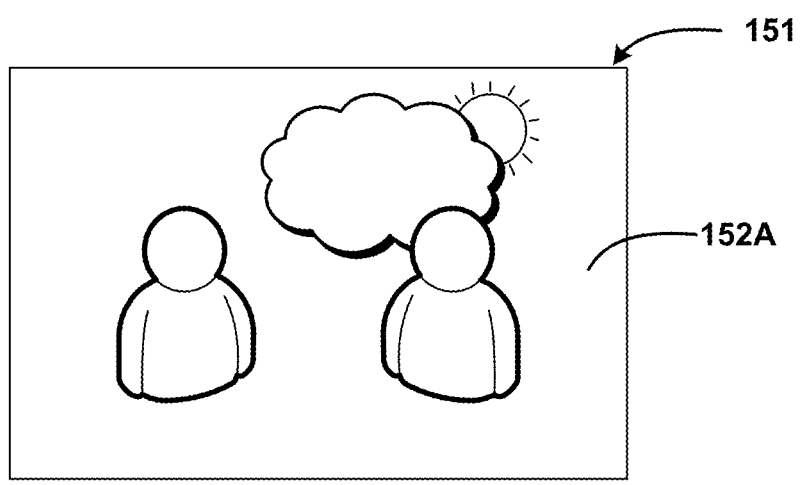
FIG. 1B illustrates an example of a non-annotated frame from a reference video stream, according to some illustrative embodiments of the concepts and technologies described herein.
Figure 1C:
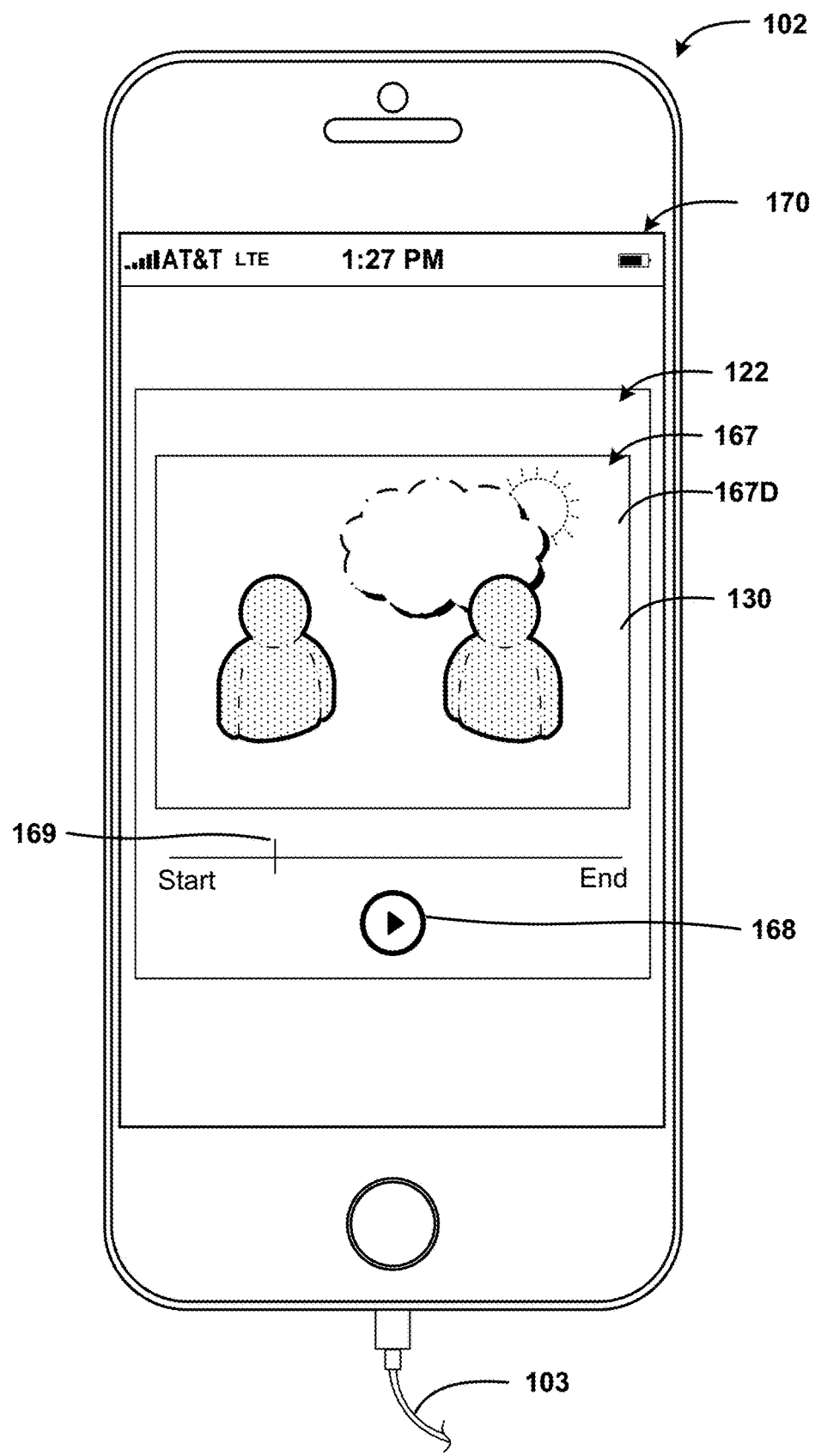
FIG. 1C illustrates an embodiment of a screen-capture video stream that captures a frame from an ABR video stream that is presented on a screen of a test device, according to some illustrative embodiments of the concepts and technologies described herein.

Continuing with the discussion of FIG. 1A and with reference to FIG. 1C illustrating an embodiment of how the ABR video stream 167 could appear when presented on the test device 102 during objective testing, the objective testing can include the test device 102 playing (i.e., executing and presenting) the video content that was received, such as the ABR video stream 167, via the use of a video player, such as a video player 168 shown in FIG. 1C. In some embodiments, the video player 168 can include a decoder that executes on the test device 102. The decoder can take video segments from the ABR video stream 167 (e.g., video data and/or audio data pertaining to one or more of the frames 167D and corresponding to a specific time along the length of the video content) and can transform the video data and/or the audio data from the video segments of the ABR video stream 167 so as to provide corrections, modifications, and/or enhancements before one or more of the frames 167D are displayed on the test device 102. For example, transformations by the video player 168 can include, but are not limited to, transforming colors of the ABR video stream 167 to and/or from YUV (where "Y" refers to luminance and "UV" refers to chrominance components of a color space) and RGB (red, green, blue), providing block artifact filtration, Gamma correction, frame interpolation, deinterlacing, compression artifact reduction, and/or other transformations before the frames 167D of the ABR video stream 167 are displayed on the test device 102. Once any transformations to the frames 167D are complete, the frames 167D can be presented on the test device 102 at a specific resolution and frame rate, thereby visually presenting the level of video quality corresponding to the track 167C that was delivered as part of the ABR video stream 167.

As the ABR video stream 167 is being played on the test device 102 via the video player 168 (e.g., frames 167D being presented on a screen of the test device 102), the video processing server 108 may trigger the video player 168 on the test device 102 and/or the master controller 110 to capture the frames 167D being displayed on the test device 102 and audio being presented in conjunction with the presentation of the frames 167D. In some embodiments, the video player can provide screen-captures while one or more of the frames 167D of the ABR video stream 167 are being displayed on the test device 102. In some embodiments, the video player 168 generates screen-capture frames 130 in response to a request from the master controller 110 executing on the video processing server 108. As used herein, the phrase "screen-capture" refers to captured video information (e.g., video data that provides the frames 167D and audio data that can be played via a speaker of the test device 102) being displayed, presented, or otherwise played on the test device 102 due to execution of the ABR video stream 167. The video player 168 of the test device 102 and/or the master controller 110 executing on the video processing server 108 can be used to generate the screen-capture frames 130 having video data 126 and audio data 128 that reflect the visual presentation of one or more of the frames 167D (and corresponding audio data) at the point in time in which the frames 167D were presented on the test device 102. For example, as one of the frames 167D is being displayed on the test device 102, the video player 168 can scrape the screen 170 and capture audio data and video data from ABR video stream 167, thereby generating a screen-capture frame 130, video data 126, and/or audio data 128 that can be sent to video processing server 108. By capturing the ABR video stream 167 via generation of the screen-capture frames 130, a screen-capture video stream 122 can be created, as discussed in further detail below.

In some embodiments, the ABR video stream 167 may contain supplemental video content that is not found in or otherwise provided by the source video 165, but instead has been added to supplement the source video 165, such as being added by a digital advertisement provider. For example, supplemental video content can include a digital video advertisement inserted at a specific time segment of the ABR video stream 167. As such, in some embodiments, the ABR video stream 167 includes the supplemental video which is reflected in one or more of the frames 167D being presented on the test device 102. In embodiments where the ABR video stream 167 has been encoded with supplemental video content (e.g., digital video advertisements) in addition to the video content provided by the source video 165, the time indications of when the frames 167D are played on the test device 102 may not directly align with the source video 165. In an embodiment where the supplemental video content is present in the ABR video stream 167, the screen-captures may generate one or more of the screen-capture frames 130 that reflect the supplemental video content displayed on the test device 102 as the ABR video stream 167 was being played on the test device 102. In some embodiments, the ABR video stream 167 contains video content that has been encoded only from the source video 165, without supplemental video content such as digital video advertisements being added to the ABR video stream 167.

As shown in FIG. 1A, one or more of the test devices 102 can be communicatively coupled to the video processing server 108 via the converter 104 and/or the switch 106. After generating the screen-capture frames 130 based on the ABR video stream 167 being presented on the test device 102, the screen-capture frames 130, video data 126, and/or audio data 128 can be communicated to the video processing server 108 via the converter 104 and/or the switch 106. In some embodiments, one or more of the test devices 102 can be in communication with the converter 104 via the use of a connector. Examples of a connector can include a dock connector having multiple pins, such as a Lightning connector, a universal serial bus connector, a high-definition multimedia interface connector, and/or other communication mediums that facilitate a communication pathway between the test device 102 and the converter 104. In some embodiments, the converter 104 can include hardware and/or software that allows for communicative coupling between differing converter interfaces, such as from a first converter interface of a first connection type (e.g., high-definition multimedia (HDMI) interface) to a second converter interface of a second connection type (e.g., a high-definition serial digital interface (HD-SDI)). The first converter interface of the first connection type can provide a communication link between the test device 102 and the converter 104, and the second converter interface of the second connection type can provide a communication link between the converter 104 and the switch 106. It is understood that the converter 104 can have more than two connection types and that the examples discussed above are for illustration purposes only, and should not be construed as limited in any way.

The converter 104 can be in communication with the switch 106. In some embodiments, the switch 106 can provide more than one communication channel between the video processing server 108 and the converter 104. As such, in some embodiments, the converter 104 and the switch 106 can support multiple streams of data from each of the test devices 102 via multiple communication channels so as to provide parallel, concurrent objective testing with multiple test devices 102. The switch 106 can provide the video processing server 108 with the data that was generated based on capturing the ABR video stream 167 presented on the test device 102 (e.g., the video data 126 and audio data 128 corresponding to the screen-capture frames 130).

In some embodiments, the video processing server 108 can include capture cards 114A-114N (collectively referred to as "capture cards 114"). In some embodiments, the capture cards 114 may include a piece of physical hardware that is configured to communicate with the switch 106 using multiple channels, such as a channel for each of the test device 102 being analyzed. The information captured from the test device 102 can be relayed from the capture cards 114 to ring buffers 116A-116N (collectively referred to as "ring buffers 116"). In some embodiments, the ring buffers 116 can each be a circular software queue that can be executed by processor 112 of the video processing server 108. The ring buffers 116 may provide a first-in-first-out data structure so as to provide an order in which information being relayed along multiple communication channels are analyzed by the video processing server 108. In some embodiments, the information received by the ring buffers 116 can be forwarded to one or more encoders 118A-118N (collectively referred to as "encoders 118"). The encoders 118 can be executed by the processor 112 and can transcode the received information (e.g., the video data 126 and/or the audio data 128 corresponding to the screen-capture frames 130) for storing in a memory 120 of the video processing server 108 and for processing by objective testing software, such as the master controller 110. In some embodiments, the encoders 118 can include software that implements libraries and instruction sets that execute on the processor 112. It is understood that the processor 112 can include a central processing unit or other processing unit that is configured in response to executing computer-executable instructions, such as computer-executable instructions provided by the master controller 110, an OCR application 113, the memory 120, and/or other information received by the video processing server 108.

According to various embodiments of the concepts and technologies disclosed herein, the master controller 110 of the video processing server 108 can initiate the capture of the ABR video stream 167 so as to create a screen-capture video stream, such as the screen-capture video stream 122, using the video data 126, the audio data 128, and the screen-capture frames 130 captured and received from the test device 102. The master controller 110 can collate and/or assemble the screen-capture frames 130 to create the screen-capture video stream 122. Thus, the screen-capture video stream 122 can include the screen-capture frames 130. The screen-capture video stream 122 can include multiple tracks, such as the screen-capture tracks 124, with each of screen-capture tracks 124 corresponding to a different level of video quality that is determined based on the screen-capture frames 130. For example, as the ABR video stream 167 is played on the test device 102, the video player (e.g., the video player 168 shown in FIG. 1C) on the test device 102 may switch between quality levels of the ABR video stream 167 by retrieving and executing different frames 167D from a different one of the tracks 167C of the ABR video stream 167. As the video player 168 shifts between the different levels of video quality for the tracks 167C, the video player will execute the frames 167D from the different one of the tracks 167C, thereby creating a transition and/or stall that may be visually reflected on a screen of the test device 102. The transition or stall due to the shifting between the different one of the tracks 167C (and thus shifting levels of video quality) can be reflected in the screen-capture frames 130. The master controller 110 can be configured to create the screen-capture video stream 122 based on the screen-capture frames 130, and thus any transitions of stalls due to shifting between the tracks 167C will be identifiable or otherwise detectable by the master controller 110 because the video data 126 and/or audio data 128 corresponding to the screen-capture frames 130 during the transitions or stalls will reflect a change in information. In some embodiments, the video data 126 can include, but should not be limited to, data related to a frame rate, a spatial resolution, a compression quality level, an amount of compression artifacts, or the like.

For example, due to, for instance, network congestion on the network 160, a lower quality track from the tracks 167C of the ABR video stream 167 having, for example, 20 frames per second and a low spatial resolution of 100 pixels per inch, may initially be selected and played by the video player 168 of the test device 102. Thus, the screen-capture frames 130 that are captured for the screen-capture video stream 122 during this time will reflect the low-quality track from the tracks 167C of the ABR video stream 167 due to the frames 167D from the low-quality track from the tracks 167C being displayed on the screen of the test device 102. Continuing with the example, if congestion of the network 160 decreases (e.g., a decrease in signal noise and/or increased bandwidth availability), the video player 168 of the test device 102 may switch to a higher-quality track of the tracks 167C by selecting, retrieving, and executing the frames 167D corresponding to the higher-quality track from the tracks 167C. The switch to the higher-quality track of the tracks 167C of the ABR video stream 167 is reflected in the screen-capture video stream 122 because the screen-capture frames 130 captured for the screen-capture video stream 122 at this time will have higher-quality characteristics, such as a higher frame rate of 30 frames per second, a higher spatial resolution of 600 pixels per inch, and/or a lower amount of compression artifacts on the screen-capture frames 130 at this time relative to the amount of compression artifacts present before the shift to the different track 167C of the ABR video stream 167 occurred.

In some embodiments, the master controller 110 can sequentially compile each of the screen-capture frames 130 and the corresponding video data 126 and audio data 128 received from the test device 102 to collectively create the screen-capture video stream 122. Upon receiving one or more of the screen-capture frames 130, the master controller 110 may create one or more of the screen-capture tracks 124 for the screen-capture video stream 122; however, the screen-capture video stream 122 will not include all video quality renditions of the frames 167D (i.e., all of the frames 167D from every one of the tracks 167C from the ABR video stream 167) because the video player 168 of the test device 102 selects, retrieves, and plays only a certain level of video quality at each segment of time, and thus only a certain number of the frames 167D corresponding to one of the tracks 167C would be presented on the test device 102 at a specific time during video execution. This means that the screen-capture frames 130 will reflect only the level of video quality that is being displayed or otherwise presented on the test device 102 at the time the frames 167D are captured, and thus not all of the frames 167D from all of the tracks 167C of the ABR video stream 167 will be reflected within the screen-capture video stream 122. Therefore, although each of the screen-capture frames 130 (and corresponding video data 126 and audio data 128) received from the test device 102 will correspond with a specific level of video quality (due to the frames 167D displayed on the test device 102 belonging to one of the tracks 167C from the ABR video stream 167), an explicit association between the screen-capture frames 130 and one of the screen-capture tracks 124 may not be readily apparent or explicitly ascertainable to the master controller 110.

Conventional objective tests may rely on a direct comparison between monitored network traffic and a source video or a reference video stream that has been obtained and/or is within in the possession of the machine performing the test. Comparatively, embodiments of the present disclosure enable the video processing server 108 to determine the video quality and the delivery quality experienced by the test device 102 playing the ABR video stream 167 by generating QoE metrics that are full reference without having to obtain the source video 165 associated with the ABR video stream 167 and/or retrieve the reference video stream 151 associated with the ABR video stream 167 during the objective test. The video processing server 108 can accomplish this by executing the master controller 110 and analyzing the screen-capture video stream 122 via use of a reference video signature package 154. In some embodiments, the master controller 110 can determine whether the information (e.g., the screen-capture frame 130) that was captured and received from the test device 102 is "annotated" or "non-annotated," and thus whether the information corresponds with a type of reference video stream that is "annotated" or "non-annotated," such as the reference video stream 151 that is considered to be "non-annotated" or the annotated reference video stream 151' that is considered to be "annotated." For clarification purposes only, an explanation of determining whether information captured and received from the test device 102 is considered "annotated" or "non-annotated," and thus the information corresponds to a type of reference video stream that is "non-annotated" or "annotated," is provided below.

As illustrated in FIG. 1A, the system 100 can include a data storage device, such a database, a memory, or other data store ("data store") 150. The functionality of the data store 150 can be provided by one or more databases, server computers, desktop computers, mobile telephones, laptop computers, other computing systems, combinations thereof, or the like. In the illustrated embodiments, the functionality of the data store 150 is provided by a database hosted by a server computer, such as video processing server 108. In some embodiments, the data store 150 can be located remotely from the video processing server 108. In some embodiments, the data store 150 and contents stored therein, such as the reference video stream 151 and/or the annotated reference video stream 151', may not be accessible to and/or retrievable by the video processing server 108 during objective testing. It should be understood that this example is illustrative, and therefore should not be construed as being limiting in any way.

In some embodiments, the memory of the data store 150 can include a type of reference video stream that is considered to be "non-annotated," such as the reference video stream 151, and/or is considered to be "annotated," such as the annotated reference video stream 151'. A discussion of the reference video stream 151 is provided first, followed by a discussion of the annotated reference video stream 151'. The reference video stream 151 refers to a duplicate, undistorted, and/or corrected version or copy of the ABR video stream 167, which may include some or all of the tracks 167C and some or all of the frames 167D contained within the ABR video stream 167. As discussed above, the ABR video stream 167 is generated by encoding the source video 165 into multiple tracks 167C that each have multiple frames 167D. Similarly, in some embodiments, the reference video stream 151 can be generated by obtaining a copy of the ABR video stream 167 that is used by the ABR video stream providers 166 and storing the reference video stream 151 in memory of the data store 150. In other embodiments, a particular machine, such as the video processing server 108, may generate the reference video stream 151 independently from the ABR video stream 167, such as by independently encoding the source video 165, thereby yielding a version of the video content from the source video 165 that is substantially similar to the ABR video stream 167. Once generated, the reference video stream 151 can be stored in some embodiments, the reference video stream 151 may be in a format that allows for delivery via a network in an ABR video streaming service. The reference video stream 151 can include non-annotated tracks 152 having one or more non-annotated frames 152A. An example of a visual representation of a non-annotated frame, such as one of the non-annotated frames 152A of the reference video stream 151, is provided in FIG. 1B, which is discussed further below. The non-annotated frames 152A for each of the one or more non-annotated tracks 152 can correspond with the frames 167D for each of the one or more tracks 167C of the ABR video stream 167 due to the reference video stream 151 and the ABR video stream 167 being substantially similar, or even the same in some embodiments due to being encoded from the same source video, such as the source video 165. As such, in some embodiments, the reference video stream 151 is associated with the source video 165, and the reference video stream 151 and/or reference video signature package 154 can include an identifier of the source video 165 ("source video identifier"). The non-annotated frames 152A of the reference video stream 151 are configured to include a digital image of video data that does not contain, present, and/or display an annotation marker, such as the annotation marker 153 discussed further below with reference to FIG. 1D, on the screen of a device, such as the test device 102, when the non-annotated frame 152A is being played by a video player, such as the video player 168. The reference video stream 151 is considered to be "non-annotated" because of the lack of presence of an annotation marker, such as the annotation marker 153. In some embodiments, the reference video stream 151 may be referred to as a "non-annotated reference video stream."

Comparatively, a type of reference video stream that is considered to be "annotated" may be referred to as an "annotated reference video stream," such as the annotated reference video stream 151'. In some embodiments, the annotated reference video stream 151' is stored in the data store 150. The annotated reference video stream 151' may appear to have a data structure that is substantially similar to the reference video stream 151 (which is explained above as being "non-annotated"). However, the annotated reference video stream 151' has additional characteristics that may not be present in the reference video stream 151. Specifically, the annotated reference video stream 151' can include one or more annotated tracks 152' that have one or more annotated frames 152A'. The presence of one or more of the annotated frames 152A' within a video stream, such as the annotated reference video stream 151', will render that video stream as being "annotated." A frame can be considered annotated (an "annotated frame"), such as the annotated frames 152A', when additional visual content has been overlaid on top of the original video content. According to embodiments, the additional visual content overlaid on top of the original content can allow for optical character recognition (OCR) of the additional visual content during an objective test, according to some embodiments of the present disclosure. The additional visual content of the one or more annotated frames 152A' can include an annotation marker, such as the annotation marker 153 illustrated in FIG. 1D. The annotation marker 153 can be visually presented on top of (i.e., overlaid) images of original video content (e.g., video content displayed on the test device 102 via the frames 167D from the ABR video stream 167 and/or an image of original content contained in the non-annotated frames 152A of the reference video stream 151 that was encoded based on the source video 165). In some embodiments, the annotated reference video stream 151' can be generated by the video processing server 108 executing the master controller 110. In embodiments, the master controller 110 can generate a copy of the reference video stream 151 (which is non-annotated), and insert or otherwise overlay additional visual content, such as the annotation marker 153, on top of one or more images of original video content (e.g., originally from the source video 165) which are presented by the non-annotated frames 152A, thereby creating the annotated frames 152A' that are separated into annotated tracks 152' and collectively create the annotated video stream 151'.

Figure 1D:
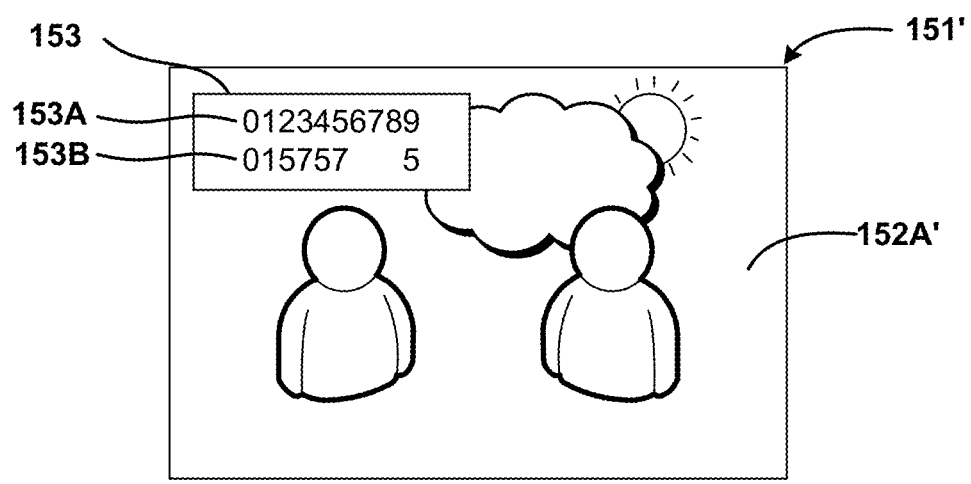
FIG. 1D illustrates an example of an annotated frame from an annotated reference video stream, according to some illustrative embodiments of the concepts and technologies described herein.

In some embodiments, the master controller 110 can determine whether the screen-captures from the test device 102 correspond with a reference video stream that is annotated, such as the annotated reference video stream 151', or a reference video stream that is non-annotated, such as the reference video stream 151, by identifying whether or not an annotation marker, such as the annotation marker 153 illustrated in FIG. 1D, was captured as part of the screen-captures from the test device 102. In some embodiments, the master controller 110 can perform an image analysis of the screen-capture frames 130 to determine the presence, or lack thereof, of the annotation marker 153 in the screen-capture frames 130. If the annotation marker 153 is found to be present within one of the frames that was screen-captured (e.g., through the master controller 110 performing image analysis to detect the shape and contents of an annotation marker), then the screen-captures would be considered annotated, such as the annotated screen-capture frames 130', and annotated screen-capture video stream 122' would be considered to correspond with an annotated reference video stream, such as the annotated reference video stream 151' (i.e., a type of reference video stream that is annotated). However, if the annotation marker 153 is not found to be present or contained within the screen-capture frames 130, then that screen-capture video stream 122 would be considered as corresponding with a reference video stream that is non-annotated, such as the reference video stream 151. Put simply, because the ABR video stream 167 does not have an annotation marker, such as the annotation marker 153, present within one of the frames 167D, the resulting screen-capture frames 130 would not contain the annotation marker 153, and thus the screen-capture video stream 122 can be determined to correspond with reference video stream 151 which is non-annotated.

To illustrate an alternative embodiment in which the master controller 110 would determine that the screen-captures from the test device 102 correspond with an annotated reference video stream 151', the following example is discussed. By way of example for clarification purposes only, in an alternate embodiment in which an objective test is performed by using the annotated reference video stream 151' streamed to the test device 102 by the streaming server 161 instead of using the ABR video stream 167 (which is not considered to be annotated) streamed to the test device 102, one or more of the annotated frames 152A' of the annotated reference video stream 151' would be captured and reflected in one or more of the annotated screen-capture frames 130' that can be compiled by master controller 110 into an annotated screen-capture video stream 122'. The manner in which the annotated reference video stream 151' is delivered and presented on the test device 102, may be substantially similar to the mechanisms discussed above with respect to delivering and presenting the ABR video stream 167. In this alternate embodiment in which the annotated reference video stream 151' is delivered to the test device 102 instead of the ABR video stream 167, the master controller 110 would determine that the annotated screen-capture video stream 122' corresponds with a reference video stream that is annotated (i.e., the annotated reference video stream 151'). If the annotated reference video stream 151' is provided to the test device 102 but playback stops or is not occurring on the test device 102, then the master controller 110 can determine that playing is not occurring or has stalled because the annotation marker 153 is (at least temporarily) not detected. However, once playing of the annotated reference video stream occurs, the annotation marker 153 will show up in the annotated screen-capture video stream 122'. The above example is provided for clarification purposes only and should not be construed as being limiting in any way.

Returning to discussion of the embodiments in which the ABR video stream 167 is delivered to one or more of the test devices 102, it is understood that in the embodiment illustrated in FIG. 1A, the ABR video stream 167 is non-annotated, and thus no annotation markers, such as the annotation marker 153, would be found in the screen-capture frames 130 of the screen-capture videos stream 122. By this, the master controller 110 can determine that the screen-capture video stream 122 corresponds with the reference video stream 151 (i.e., a reference video stream that is non-annotated). In some embodiments, the master controller 110 may preemptively determine that the screen-capture video stream 122 corresponds with the reference video stream 151 because the master controller 110 may initiate objective testing on the test device 102 using an ABR video stream that is already known to be non-annotated, such as the ABR video stream 167, and thus the screen-capture video stream 122 would also not be annotated. In another embodiment, the master controller 110 can identify the title or other unique identifier (e.g., a name used to identify the video content from the source video 165) of the ABR video stream 167 that may be captured or contained in the data of the screen-capture video stream 122. The master controller 110 can use the unique identifier to determine that the screen-capture video stream 122 corresponds with a reference video stream that is non-annotated by determining that the reference video stream 151 also has the unique identifier of the ABR video stream 167 which was captured in the screen-capture video stream 122 (which may be because the reference video stream 151 can be substantially similar to the ABR video stream 167 as discussed above).

In embodiments of the present disclosure, the reference video stream 151 is associated with a reference video signature package 154. The reference video signature package 154 can be stored in a storage device, such as the memory 120 and/or in a remote data store that is accessible to the master controller 110. Retrieving and/or obtaining all or some of the reference video stream 151 in order to provide a direct comparison with the screen-capture video stream 122 for use in objective testing may not be an option at the time of performance of the objective testing due to the inaccessibility of the reference video stream 151 and/or constraints from the available network and processing resources. Without the reference video stream 151, conventional objective testing may not be able to provide for full reference and/or reduced reference analysis. However, embodiments of the concepts and technologies presented herein allows for objective testing with full reference and/or reduced reference analysis without having to retrieve and/or obtain a reference video stream, such as the reference video stream 151, at the time of performance of the objective testing. Embodiments of the present disclosure can provide objective testing via the use of a reference video stream package, such as the reference video signature package 154.

Once the master controller 110 determines that the screen-capture video stream 122 corresponds with a reference video stream that is non-annotated, such as the reference video stream 151, the master controller 110 may obtain (e.g., retrieve from local memory or a cloud data store) a reference video signature package that is associated with the reference video stream that is non-annotated, such as the reference video signature package 154 associated with the reference video stream 151. It must be understood that the video processing server 108 provides objective testing using the screen-capture video stream 122 without retrieving or obtaining a source video, such as the source video 165, and/or a reference video stream, such as the reference video stream 151 at the time of performance of the objective testing. This can improve the processing speed with which the video processing server 108 can perform objective testing to provide QoE metrics because the time to perform objective testing can be reduced (relative to conventional testing that requires retrieval of a source video or reference video stream at the time of performance of the objective testing). Additionally, the resources of the network 160 and resources of the video processing server 108 are not spent on retrieving and/or obtaining the source video 165 and/or the reference video stream 151 that may have a large file size (e.g., over one terabyte, for example).

For clarification purposes only, the following discussion is provided to explain how a reference video signature package, such as the reference video signature package 154, is generated, used, and implemented. It must be understood that the reference video signature package 154 may be generated only for a reference video stream that is non-annotated, such as the reference video stream 151. As such, the annotated reference video stream 151' is not associated with a reference video signature package because other techniques to provide objective testing using the OCR application 113 may be implemented when the annotated reference video stream 151' is used for objective testing instead of the ABR video stream 167 which will be discussed in more detail below with respect to FIG. 2.

In various embodiments, the reference video signature package 154 can be generated by the video processing server 108, such as via execution of the master controller 110. In some embodiments, the reference video signature package 154 can be generated prior to the start of objective testing and can be stored in a storage device, such as the memory 120 and/or a remote database that is accessible to the video processing server 108, such as a cloud data store. In some embodiments, a computer system other than the video processing server 108 can generate the reference video signature package 154 and provide the reference video signature package 154 to the video processing server 108.

The reference video signature package 154 can have a file size that is significantly smaller than the file size of the reference video stream 151. According to embodiments, the reference video signature package 154 can be, for example, one-tenth the file size of the reference video stream 151, or even less. This can allow the reference video signature package 154 to be used in objective testing instead of the reference video stream 151. This can also allow the reference video signature package 154 to be obtained and/or retrieved even when congestion is occurring on the network 160.

The reference video signature package 154 can be generated based on the reference video stream 151 that is non-annotated and that is associated with the ABR video stream 167 that was delivered to the one or more of the test devices 102. In some embodiments, the reference video signature package 154 can include one or more time stamps 156 and one or more reference video strings 158, where each of the reference video strings 158 can be associated with one or more of the time stamps 156. In some embodiments in which the reference video signature package 154 is generated by the master controller 110, the master controller 110 can first obtain one or more of the non-annotated frames 152A from each of the non-annotated tracks 152 of the reference video stream 151. The master controller 110 may generate a reference video string 158 for some or all of the non-annotated frames 152A from the reference video stream 151. In some embodiments, one or multiple reference video strings 158 are created for at least one, or each, of the non-annotated frames 152A. Each non-annotated frame 152A has pixels, and each pixel of the non-annotated frame 152A has one or more values corresponding to each color channel (e.g., R, G, and/or B), where the values can be analyzed and used for conversion to a binary color (e.g., conversion to a black pixel or white pixel) for the generation of the reference video string 158. In embodiments, each color channel can have a defined range, such as from 0-255, and the pixel value corresponding to each color channel can fall within the defined range. In some embodiments, the reference video string 158 can be generated by converting color pixels contained in the non-annotated frames 152A into a black or white pixel. Specifically, the master controller 110 can generate a color histogram of the color channels (e.g., RGB (Red, Green, and Blue) or YUV ("Y" corresponding to a luminance component and "U" & "V" corresponding to chrominance components)) for pixels in one or more of the non-annotated frames 152A of the reference video stream 151. Each pixel can include a value corresponding to each color channel of the color histogram. The master controller 110 can establish a reference threshold value for each color channel (e.g., R, G, B and/or Y, U, V) based on the color histogram that was generated, such as a reference value that is within the defined range. In some embodiments, the reference threshold value can correspond to a peak value of the histogram for one of the color channels (e.g., for one or more of R, G, B and/or Y, U, V). In other embodiments, the reference threshold value can correspond to an average value of the histogram for one of the color channels.

In some embodiments, a color pixel of the non-annotated frame 152A can be converted to a black pixel when the pixel's values for each color channel is below each of the corresponding reference threshold values, else the color pixel is converted to a white pixel. For example, when a color pixel's value for each color channel (e.g., R, G, and B) is equal to or below the corresponding reference threshold values, then the color pixel can be converted to a black pixel, which in turn can be assigned or converted to a value of "0," as explained below; however, if not every pixel value for each color channel is equal to or below the corresponding reference threshold values (e.g., at least one pixel value for a color channel being above a reference threshold value) then the color pixel is converted to a white pixel. In an alternate embodiment, a color pixel of the non-annotated frame 152A can be converted to a white pixel (which can be assigned a value of "1") when the pixel's value for each color channel is above each of the corresponding reference threshold values, else the color pixel is converted to a black pixel. For example, when a color pixel's value for each color channel (e.g., R, G, and B) are each above the reference threshold values corresponding to R, G, and B, then the color pixel can be converted to a white pixel, which in turn can be assigned or converted to a value of "1," however, if not every pixel value for R, G, and B is above each of the corresponding reference threshold values (e.g., at least one pixel value for a color channel being at or below the reference threshold value for that color channel) then the color pixel is converted to a black pixel. It is understood that, in some embodiments, the master controller 110 can orchestrate, initiate, and/or induce performance of the functions discussed herein by calling separate subroutines and/or modules to perform image processing functions. It is to be understood that the concepts and technologies disclosed herein are not necessarily limited to being performed entirely and/or exclusively by a particular feature described herein (e.g., the master controller 110), but rather the features are disclosed as example forms of implementing the concepts and technologies disclosed herein. As such, the examples described herein are provided by way of illustration only and should not be construed as limiting.

In another embodiment, when the pixel is analyzed in terms of YUV, the master controller 110 can determine whether the pixel's Y value (for luminance color channel) is at or below the corresponding reference threshold value for luminance, and if so (i.e., if the pixel's Y value is at or below the reference threshold value for luminance), then the color pixel is converted to a black pixel, but if not (i.e., if the pixel's Y value is above the reference threshold value for luminance), then the color pixel is converted to a white pixel. It is understood that these are examples and should not be construed as limiting in any way. By this, the pixels contained in the non-annotated frames 152A in the reference video stream 151 can be converted to a binary color (i.e., black or white). The master controller 110 can create one or more reference video strings, such as the reference video string 158, based on the pixels of the non-annotated frame 152A that were converted to a binary color. The reference video string 158 can be a bit string that has a sequence of binary digits (e.g., "0" or "1"), where each binary digit in the sequence is associated with a pixel that was converted to a binary color. For example, the pixels can be assigned to a binary digit of "0" or "1," where a black pixel is assigned to "0" while a white pixel is assigned to "1," or vice-versa in an alternate embodiment. The binary digits can be assembled into a specific sequence, such as a sequence that is 64 bits in length. The unique arrangement of binary digits based on the converted pixels can allow the reference video strings 158 to reflect color pixels of the non-annotated frames 152A and thus allow for objective testing analysis of the screen-capture video stream 122 without the master controller 110 having to obtain the reference video stream 151 and/or the source video 165. The master controller 110 can associate the reference video strings 158 for each non-annotated frame 152A with one or more of the time stamps 156 so that the reference video strings 158 correspond to a temporal sequence in which video content is played. The master controller 110 can compile, concatenate, assemble, or otherwise package the reference video strings 158 and the time stamps 156 into a reference video signature package, such as the reference video signature package 154.

Once the reference video signature package 154 is generated, the master controller 110 can identify the location in which the reference video signature package 154 is being stored, such as in the memory 120 or a remote data store. With the reference video signature package 154 identified, the master controller 110 can obtain the reference video signature package 154 (which is associated with the reference video stream 151 and thus the screen-capture video stream 122), such as from the memory 120. In some embodiments, the master controller 110 can determine that there exists pixel distortion shown in the screen-capture frames 130 and/or the video data 126 of the screen-capture video stream 122. The pixel distortion can demonstrate a discrepancy in the sequence in which the screen-capture frames 130 in the screen-capture video stream 122 are arranged relative to the temporal sequence in which the non-annotated frames 152A of the reference video stream 151 are arranged. By this, the temporal alignment of the sequence of screen-capture frames 130 in the screen-capture video stream 122 is different than the sequence of the non-annotated frames 152A in the reference video stream 151. By using the reference video signature package 154, the master controller 110 can temporally align the screen-capture video stream 122 with the reference video stream 151, despite not actually retrieving or otherwise obtaining the reference video stream 151 to perform the objective testing and/or the alignment. In some embodiments, aligning the screen-capture video stream 122 can occur after the master controller 110 determines that pixel distortion exists. Because one or more of the screen-capture frames 130 can have color space distortion (whereas color space distortion is not present in the non-annotated frames 152A), conventional pixel-by-pixel comparison of colors may not be feasible or possible in order to align the screen-capture frames 130 with the non-annotated frames 152A. In some embodiments, non-annotated frames 152A may be referred to as "non-annotated reference frames."

To align the screen-capture video stream 122 with the reference video stream 151 without retrieving or otherwise obtaining the source video 165 and/or reference video stream 151, the master controller 110 can use the reference video signature package 154, specifically using one or more of the reference video strings 158 discussed above. The master controller 110 can generate a screen-capture video string 134 based on a binary pixel image 132 in order to align the screen-capture frames 130 of the screen-capture video stream 122 with the non-annotated frames 152A of the reference video stream 151. In some embodiments, the master controller 110 can generate a binary pixel image 132 for some of the screen-capture frames 130 that correspond to a specific time segment that is also reflected in one of the time stamps 156 of the reference video signature package 154. However, it should be understood that the master controller 110 may not be able to rely on reference to the time stamps 156 by themselves for alignment because the screen-capture video stream 122 may have duplicates of the screen-capture frames 130 and/or transitions or stalls that further promote misalignment.

The generation of the binary pixel image 132 from one of the screen-capture frames 130 can be performed by substantially similar to the process discussed above with respect to the generation of the reference video strings 158 based on conversion of pixels in the non-annotated frames 152A. For example, the screen-capture frames 130 includes pixels, and each pixel can provide one or more values corresponding to one or more color channels (e.g., R, G, B, or Y, U, V). In embodiments, the values can be within a defined range, such as from 0-255. The master controller 110 can generate a binary pixel image 132 by creating a color histogram of the color channels (e.g., R, G, B or Y, U, V) from the values of one or more of the pixels (or each pixel) in the screen-capture frames 130 of the screen-capture video stream 122. The master controller 110 can establish a screen-capture threshold value (within the defined range) for each of the color channels based on color histogram pertaining to the screen-capture frames 130 of the screen-capture video stream 122. The screen-capture threshold value can be different from the reference threshold value corresponding to the pixels of the non-annotated frames 152A due to the color space distortion that can exist in the screen-capture frames 130. In some embodiments, the screen-capture threshold value can correspond to a peak value of the color histogram for one of the color channels (e.g., for one or more of the R, G, B, and/or Y, U, V). In other embodiments, the screen-capture threshold value can correspond to an average value of the color histogram for one of the color channels. Using the screen-capture threshold values, the master controller 110 can convert colored pixels into binary colors (e.g., black or white). In some embodiments, a color pixel of the screen-capture frame 130 can be converted to a black pixel when the pixel's values for each color channel is below each of the corresponding screen-capture threshold values, else the color pixel is converted to a white pixel. For example, when a color pixel's value for every color channel (e.g., R, G, B or Y, U, V) is equal to or below the corresponding screen-capture threshold values, then the color pixel can be converted by the master controller 110 to a black pixel, which in turn can be assigned or converted to a value of "0," as explained below; however, if not every pixel value for each color channel component is equal to or below the corresponding screen-capture threshold values (e.g., at least one pixel value for a color channel being above a screen-capture threshold value) then the color pixel is converted to a white pixel (which can be assigned a value of "1"). In an alternate embodiment, a color pixel of the screen-capture frame 130 can be converted to a white pixel (which can be assigned a value of "1") when the pixel's value for each color channel is above each of the corresponding screen-capture threshold values, else the color pixel is converted to a black pixel. For example, when a color pixel's value for each color channel (e.g., R, G, and B) are each above the screen-capture threshold values corresponding to R, G, and B, then the color pixel can be converted by the master controller 110 to a white pixel, which in turn can be assigned or converted to a value of "1," however if not every pixel value for R, G, and B is above each of the corresponding reference threshold values (e.g., at least one pixel value for a color channel being at or below the screen-capture threshold value for that color channel) then the color pixel is converted to a black pixel. The conversion can be performed for one or more (or each) pixel of the screen-capture frame 130.

In another embodiment, when the pixel of the screen-capture frame 130 has values corresponding to YUV, and thus is analyzed in terms of YUV, the master controller 110 can determine whether the pixel's Y value (for luminance) is at or below the corresponding screen-capture threshold value for luminance, and if so (i.e., if the pixel's Y value is at or below the screen-capture threshold value for luminance), then the color pixel is converted to a black pixel (or "0"), but if not (i.e., if the pixel's Y value is above the screen-capture threshold value for luminance), then the color pixel is converted to a white pixel (or "1"). It is understood that these are examples and should not be construed as limiting in any way. By this, the pixels contained in the screen-capture frames 130 in the screen-capture video stream 122 can be converted to a binary color (i.e., black or white), thereby resulting in the generation of a binary pixel image, such as the binary pixel image 132 that can contain pixels of binary colors. The master controller 110 can create one or more screen-capture video strings, such as the screen-capture video string 134, based on the pixels of the screen-capture frame 130 that were converted to a binary color.

To continue in providing alignment, the master controller 110 can create a screen-capture video string 134 that is based on the binary pixel image 132 that was generated from one of the screen-capture frames 130. The screen-capture video string 134 can be a bit string that has a sequence of binary digits (e.g., "0" or "1"), where each binary digit in the sequence is associated with a converted pixel in the binary pixel image 132. Each pixel in the binary pixel image 132 can correspond with one bit of storage in the screen-capture video string 134 (e.g., each pixel corresponding to a binary digit of 1 or 0). For example, at least some of the converted pixels can be assigned a binary digit of "0" or "1," where, for example, a black pixel can be assigned to "0" while a white pixel is assigned to "1," or vice-versa. The screen-capture video string 134 can assemble the binary digits into a specific sequence that has a defined amount of binary digits ("bit length"), such as bit length of 64 bits. The reference video strings 158 can be generated to be uniform in bit length, and therefore, the master controller 110 can define the screen-capture video strings 134 with a bit length that matches that of the reference video strings 158. Put simply, the reference video strings 158 and the screen-capture video strings 134 can have the same bit length, such as 32 bits, 64 bits, 128 bits, or another defined length. In some embodiments, multiple screen-capture video strings 134 can be created for a screen-capture frame 130 for comparison with corresponding reference video strings 158.

With at least some of the screen-capture video strings 134 created, the master controller 110 may extract one or more of the reference video strings 158 from the reference video signature package 154. To compare the alignment of the non-annotated frames 152A with the screen-capture frames 130, the master controller 110 may determine differences in the screen-capture video strings 134 and the reference video strings 158. The master controller 110 can determine whether differences exist by comparing the binary digits that occupy each location along the bitlength of the screen-capture video strings 134 with the reference video strings 158. For example, the master controller 110 can compare whether each location in the reference video strings 158 and the screen-capture video string 134 both have a "1" or "0," and if not, then a discrepancy exists and denotes a pixel distance between the respective reference video string 158 and the screen-capture video string 134.

The master controller 110 can create a pixel difference string 137 based on the comparison between the reference video string 158 and the screen-capture video string 134. The pixel difference string 137 can have the same bitlength as the reference video string 158 and the screen-capture video string 134. If the binary digits at the same location along the bitlength for the reference video string 158 and the screen-capture video string 134 do not match (e.g., a discrepancy exists because the reference video string 158 has a "1" at the same location of the sequence where the screen-capture video string 134 has a "0"), then the master controller 110 can insert a binary digit (e.g., "1") at the location along the bitlength of the pixel difference string 137 that is the same as the location that was analyzed in the reference video string 158 and the screen-capture video string 134. Where no difference in binary digits exists between the reference video string 158 and the screen-capture video string 134 (e.g., no discrepancy exists because both the reference video string 158 and screen-capture video string 134 having a "1" or "0" at the same location along the respective sequence), then the master controller 110 can insert a binary digit that is opposite of that used when a discrepancy is identified (e.g., the use of a "0" digit to indicate no discrepancy when a "1" digit is used to indicate existence of a discrepancy), and the binary digit that is used to indicate no discrepancy is inserted at the location along the bitlength of the pixel difference string 137 that is the same as the location that was analyzed in the reference video string 158 and the screen-capture video string 134.

The master controller 110 can complete the creation of the pixel difference string 137 once each location along the bitlength of the pixel difference string 137 has been populated based on the comparison between the reference video string 158 and the screen-capture video string 134. Using the pixel difference string 137, the master controller 110 can determine a pixel distance value 136. The pixel distance value 136 can be used to quantify the amount of pixel distortion present between the screen-capture frames 130 of the screen-capture video stream 122 and the non-annotated frames 152A of the reference video stream 151, which in turn can be used to align the screen-capture video stream 122 with the reference video stream 151. In some embodiments, the master controller 110 can create the pixel distance value 136 identifying a certain type of binary digit in the pixel difference string 137 that corresponds with the existence of a discrepancy discussed above, and then add the binary digits of that type together. For example, if the binary digit of "1" is used to indicate a discrepancy at a sequence location between the reference video string 158 and the screen-capture video string 134, then the master controller 110 can sum the binary digits with the value of "1" to produce the pixel distance value 136.

The master controller 110 can create a pixel distance value 136 for every pixel difference string 137, which in turn means that a pixel distance value 136 can be created every time the master controller 110 compares one of the reference video strings 158 with one of the screen-capture video strings 134. In some embodiments, the master controller 110 can determine which pixel distance value 136 is the lowest when a screen-capture video string 134 is compared against each of the other reference video strings 158. The pixel distance value 136 that is the lowest can indicate alignment between the non-annotated frame 152A and the screen-capture frame 130 that were used to create the corresponding one of the reference video strings 158 and one of the screen-capture video strings 134 that yielded the lowest value of the pixel distance values 136. The master controller 110 can identify which of the reference video strings 158 and the screen-capture video strings 134 were used to create the lowest pixel distance value 136 via the pixel difference string 137, and in turn identify the corresponding non-annotated frame 152A and the screen-capture frame 130. Therefore, the master controller 110 can align the screen-capture frames 130 of the screen-capture video stream 122 to the non-annotated frames 152A of the reference video stream 151 by determining which pixel distance value 136 is the lowest when one of the screen-capture video strings 134 is compared against each of the other reference video strings 158. Further discussion of aspects for alignment are described below with respect to FIG. 3.

In some embodiments, the master controller 110 can quantify a QoE for the screen-capture video stream 122 based on using the reference video signature package 154, the screen-capture video strings 134, the pixel difference strings 137, and/or the pixel distance values 136. The quantification of the QoE for the screen-capture video stream 122 can include the generation of full reference video quality (FRVQ) performance indicators, such as the FRVQ performance indicators 138, and/or delivery quality (DQ) performance indicators, such as the DQ performance indicators 140. Examples of the FRVQ performance indicators 138 can include a spatial resolution indicator 138A, a frame rate indicator 138B, a compression artifacts indicator 138C, and/or a pixel depth indicator 138D. Examples of DQ performance indicators 140 can include a video startup time indicator 140A, a video stall indicator 140B, a rate switching indicator 140C, and/or a latency indicator 140D.

Regarding the FRVQ performance indicators 138, the master controller 110 can create one or more of the FRVQ performance indicators 138 by identifying whether duplicates (i.e., repeats) of the screen-capture frames 130 exist within the screen-capture video stream 122. For example, when the master controller 110 completes aligning the screen-capture frames 130 of screen-capture video stream 122 with the non-annotated frames 152A of reference video stream 151 as discussed above, the master controller 110 may determine that one or more of the screen-capture frames 130 are duplicated (i.e., repeated) within in the screen-capture video stream 122 based on multiple pixel distance values 136 having the same value. Because the screen-capture video stream 122 has already been aligned with the reference video stream 151 (e.g., by using the process discussed above), the amount of computing resources used by the video processing server 108 to search for duplicated screen-capture frames 130 is minimized when compared to brute force image comparison that would involve obtaining the reference video stream 151 at the time of performance of the objective testing. In some embodiments, duplicates of the screen-capture frames 130 are detected by the master controller 110 by computing the absolute value difference between two of the pixel distance values 136 that correspond with two of the screen-capture frames 130 that are neighbors (i.e., are in sequential order next to each other). Put differently, if the pixel distance value 136 is zero for two of the screen-capture frames 130 that are neighbors, then a duplicate in the screen-captured frames 130 would be determined by the master controller 110.

The frequency (i.e., amount) of the screen-capture frames 130 that are unique (i.e., the screen-capture frames 130 that are not repeated in the screen-capture video stream 122) can yield the frame rate that was used to present the associated frames 167D of the ABR video stream 167 on the test device 102, and thus also reflected in the screen-capture frames 130 of the screen-capture video stream 122. In some embodiments, the master controller 110 can perform a spatial frequency analysis on the unique (i.e., non-repeated) screen-capture frames 130, thereby yielding the spatial resolution indicator 138A of the FRVQ performance indicators 138. The frame rate of the screen-capture track 124 can be stored as the frame rate indicator 138B of the FRVQ performance indicators 138. With the frame rate and the spatial resolution of the screen-capture frames 130 determined, the master controller 110 can identify the track 167C that was used to present the ABR video stream 167, and thus the master controller 110 can use the identification of the track 167C to assign one or more of the screen-capture frames 130 to a screen-capture track 124 for the associated time segment of video content. As such, the combination of the spatial resolution indicator 138A and the frame rate indicator 138B can provide an indication as to the level of video quality that can be used to categorize and assign the screen-capture frames 130 to one of the screen-capture tracks 124. In some embodiments, the pixel distortion that is present within the screen-capture frames and/or video data 126 can be visually reflected in the screen-capture video stream 122 as visual artifacts that appear as a result of compression of the ABR video stream 167. As such, the master controller 110 can create the compression artifacts indicator 138C that can be used to quantify the amount of visual artifacts that are present in the screen-capture frames 130 as a result of compression of a video stream, such as the ABR video stream 167.

Regarding the DQ performance indicators 140, in some embodiments, the master controller 110 can determine the DQ performance indicators 140 for the screen-capture video stream 122 based on using the reference video signature package 154, the screen-capture video strings 134, the pixel difference strings 137, and/or the pixel distance values 136. As mentioned above, the DQ performance indicators 140 can include a video startup time indicator 140A, a video stall indicator 140B, a rate switching indicator 140C, and/or a latency indicator 140D. The master controller 110 can determine the video startup time indicator 140A by detecting a length of time that occurs from when the ABR video stream 167 is received by the test device 102 until the first one of the frames 167D of the ABR video stream 167 initially appears on the screen of the test device, which is reflected in the screen-capture frames 130 of the screen-capture video stream 122.

The master controller 110 can create the video stall indicator 140B by determining an amount of stalls present in the screen-capture video stream 122. The amount of stalls can be detected by the master controller 110 counting the number of consecutively repeated screen-capture frames 130 and applying a threshold to the amount of repeated screen-capture frames in order to distinguish between a low frame rate and stalls. The threshold used to detect the stalls can be a defined amount below the average frame rate of the screen-capture video stream 122. Because the entire screen-capture video stream 122 has screen-capture frames 130 from different screen-capture tracks 124, the master controller 110 can expect a minimum number of the screen-capture frames 130 to be present per the screen-capture track 124 of the screen-capture video stream 122, thereby allowing the master controller 110 to determine an average stable frame rate.

The rate switching indicator 140C refers to the frequency with which the video player, such as the video player 168, on the test device 102 switched between tracks 167C of the ABR video stream 167, which is captured and reflected in the screen-capture video stream 122 indicating switches between screen-capture tracks 124. In some embodiments, the master controller 110 can generate a value for the rate switching indicator 140C by determining how often the spatial resolution indicator 138A changes, thereby indicating how often rate switching occurs. In some embodiments, the FRVQ performance indicators can also indicate a rate switch.

The latency indicator 140D can indicate the length of time that occurs from when one of the frames 167D of the ABR video stream 167 is received on the test device 102 until the frame 167D is executed by the video player and displayed on the screen of the test device 102.

In some embodiments, the video processing server 108 can provide results from objective testing that can be stored, delivered, or otherwise provided to ABR video stream providers, such as the ABR video stream provider 166, in a fraction of the time compared to a conventional system. In some embodiments, the master controller 110 provides the results using an objective QoE data structure, such as the objective QoE data structure 142. The master controller 110 can join the FRVQ performance indicators 138 and the DQ performance indicators 140 so as to form the objective QoE data structure 142. In some embodiments, the FRVQ performance indicators 138 and the DQ performance indicators 140 corresponding to the screen-capture video stream 122 is associated with one of the test devices 102 that produced the screen-capture video stream 122. In some emblements, the master controller 110 can create an objective QoE data structure for each of the screen-capture video streams 122 that was created during the objective testing. In other embodiments, multiple screen-capture video streams 122 can correspond with one objective QoE data structure 142 because the FRVQ performance indicators 138 and the DQ performance indicators 140 from various screen-capture video streams 122 may be assembled into one data structure and identified based on one of the test devices 102. The objective QoE data structure 142 can have an identifier of the ABR video stream 167 and/or the source video 165, thereby allowing for ease of identification for the ABR video stream provider 166. In some embodiments, the objective QoE data structure 142 can be pushed to a data storage device, such as a cloud data store or the data store 150, for later access by one or more ABR video stream providers 166.

Turning now to FIG. 1B with reference to FIG. 1A, an example of a non-annotated frame from a reference video stream is shown for illustrative purposes only, according to some embodiments of the concepts and technologies described herein. As discussed above with respect to the system 100, the reference video stream 151 is associated with the ABR video stream 167. As such, the reference video stream 151 could be executed and displayed on a video player of a test device, such as one of the test devices 102. FIG. 1B shows a visual depiction of one of the non-annotated frames 152A that is contained within the reference video stream 151. It is understood that the example of the non-annotated frame 152A and the reference video stream 151 illustrated in FIG. 1B is provided for clarification purposes only, and therefore should not be construed as being limiting in any way.

Turning now to FIG. 1C with reference to FIG. 1A, an embodiment of a screen-capture video stream that captures a frame from an ABR video stream that is presented on a screen of a test device, according to the concepts and technologies described herein. As discussed above with respect to FIG. 1A, the test device 102 can receive a frame 167D of the ABR video stream 167. As seen in FIG. 1C, the video player 168 of the test device 102 can execute and play the ABR video stream 167, which in turn can cause a screen 170 of the test device 102 to display or otherwise present the frame 167D on the test device 102. The frame 167D that is presented on the screen 170 of the test device 102 can be associated with a time indicator 169 that denotes a time segment in which the ABR video stream 167 is played. As discussed above with respect to FIG. 1A, the video player 168 (and/or the master controller 110 from video processing server 108) can capture the ABR video stream 167 so as to create the screen-capture video stream 122. As such, the frame 167D that is being displayed on the screen 170 is captured and reflected in the screen-capture video stream 122 as screen-capture frame 130. In the embodiment shown in FIG. 1C, the screen-capture video stream 122 can be communicated to the video processing server 108 (shown in FIG. 1A) via the use of the connector 103. The connector 103 can provide a communication path or channel to a device that is between the test device 102 and the video processing server 108, such as the connector 103 transmitting the screen-capture video stream 122 to the converter 104 and/or switch 106 discussed in FIG. 1A. It is understood that in some embodiments, the screen-capture video stream 122 may be wirelessly transmitted to the video processing server 108. It must be understood that the above example is illustrative and for clarification purposes only, and therefore should not be construed as being limiting in any way.

Turning now to FIG. 1D with reference to FIG. 1A, an example of an annotated frame from an annotated reference video stream, such as the annotated reference video stream 151', is disclosed, according to the concepts and technologies described herein. The annotated reference video stream 151' is associated with the ABR video stream 167 and the reference video stream 151; however, the annotated reference video stream 151' includes one or more annotated frames, such as the annotated frame 152A' shown in FIG. 1D, which are not found in a non-annotated reference video stream, such as the reference video stream 151 shown and discussed with respect to FIG. 1B. As discussed above with respect to the system 100, the annotated reference video stream 151' is a type of reference video stream that is "annotated" due to the presence of an annotation marker, such as the annotation marker 153, in at least one or more of the annotated frames, such as the annotated frame 152A'. As illustrated in the embodiment of FIG. 1D, the annotated frame 152A' can include the annotation marker 153 that is overlaid on top of video content from a source video, such as the source video 165 (where the video content would also appear in a non-annotated frame 152A of the reference video stream 151).

To create the annotated frames 152A', in some embodiments, a program, such as the master controller 110 or another device that can include a transcoder, can create a copy of the reference video stream 151 that includes the non-annotated frames 152A. Using the copy of the reference video stream 151, the master controller 110 can convert one or more of the non-annotated frames 152A into an annotated frame, such as the annotated frame 152A', by inserting an annotation marker, such as the annotation marker 153, on top of the visual image presented in the non-annotated frame 152A. As shown in FIG. 1D, the annotation marker 153 is depicted as a rectangular shape; however, it is understood that the rectangular shape shown is for illustration purposes only, and other shapes, characters, and/or markings that are additional visual content overlaid at various positions on the original image are within the scope of the present disclosure. In some embodiments, the annotation marker 153 can include one or more numbered rows, such as a first numbered row 153A and a second numbered row 153B. It is understood that the use of the terms "first" and "second" are for clarification purposes only, and are not intended to assign a hierarchical value, an order, or that only two rows are present, and therefore should not be construed as limiting in any way.

In the embodiment illustrated in FIG. 1D, the master controller 110 can overlay two numbered rows within the annotation marker 153, such as the first numbered row 153A and the second numbered row 153B. The master controller 110 can insert a sequence of digits (e.g., ten digits from "0"-"9" in increasing and/or decreasing order) within the first numbered row 153A, and the sequence of digits is used as a template "template of digits" so that every annotated frame 152A' can be read by the OCR application 113 upon being screen-captured, which will be discussed with respect to FIG. 1E. The master controller 110 can align the second numbered row 153B below the template digits in the first numbered row 153A. The second numbered row 153B can include a shorter sequence of digits (e.g., five or less separate digits between "0"-"9") that are arranged in a series so as to indicate a frame number. After the series of digits that indicates the frame number, the second numbered row 153B can have one or more blank spaces, which are then followed by a single digit (e.g., between "0"-"9") that is used to indicate a level of video quality or track number (e.g., "0" being used to indicate the lower level of video quality and "9" being used to indicate the highest level of video quality). The single digit in the second numbered row 153B that indicates the level of video quality may be aligned under the last digit in the template digits of the first numbered row 153A. The annotation marker 153 can be unique to each of the annotated frames 152A'. Similarly, the second numbered row 153B can be unique to each annotation marker 153 for a particular annotated frame 152A'.

It is understood that the second numbered row 153B within each annotation marker 153 will provide a different sequence of numbers to indicate the different frame numbers and different levels of video quality for the annotated frame 152A'. Each of the first numbered row 153A and the second numbered row 153B can be inserted on the same overlay or separate overlays at a defined position relative to the boundaries of the annotation marker 153 within the annotated frame 152A'. In some embodiments, every frame of the annotated reference video stream 151' can be considered "annotated" because every frame within the annotated reference video stream 151' includes an annotation marker 153. It is understood that the example of the annotated frame 152A' and the annotated reference video stream 151' illustrated in FIG. 1D is provided for clarification purposes only, and therefore should not be construed as being limiting in any way.

Figure 1E:
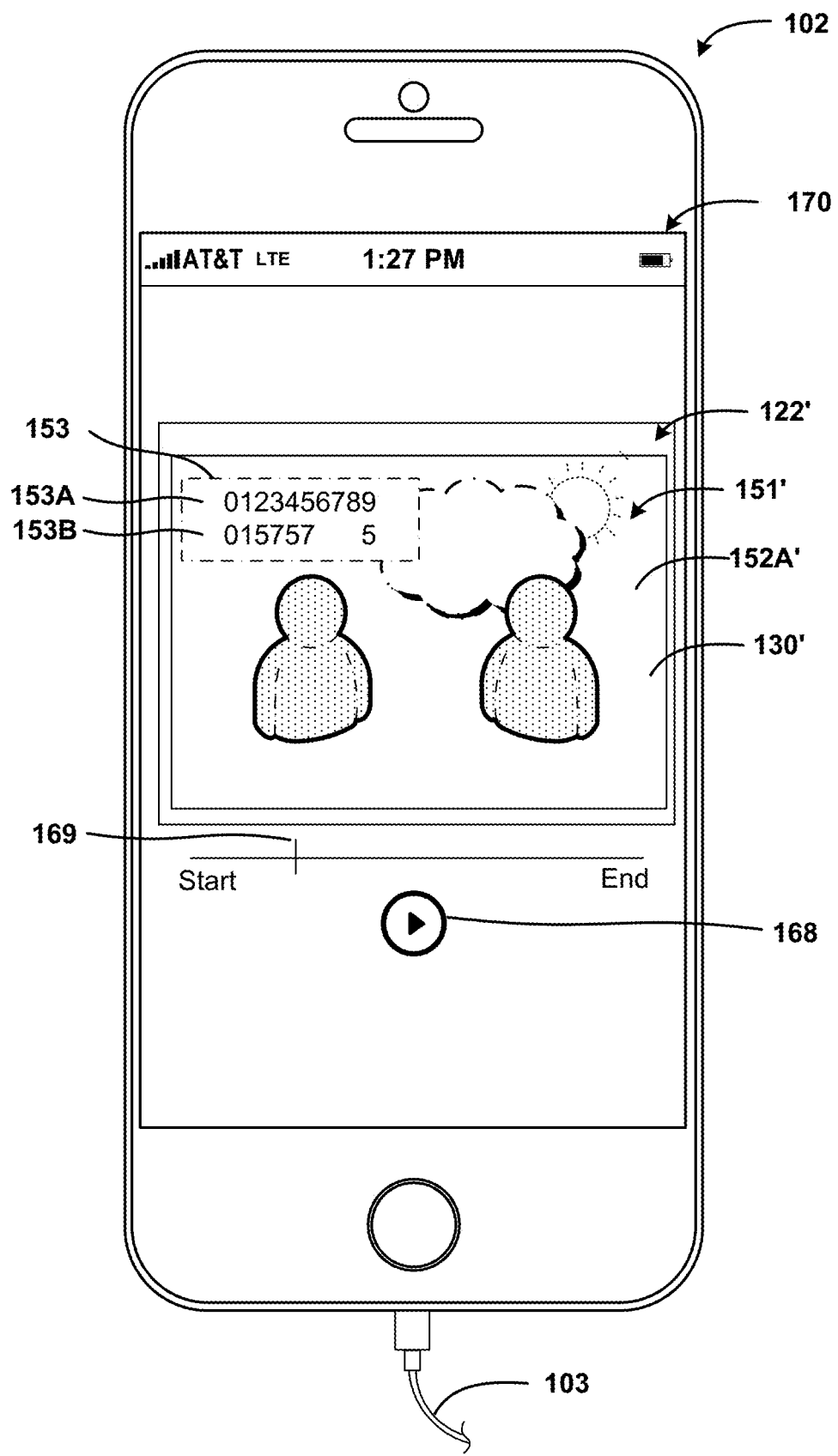
FIG. 1E illustrates an embodiment of an annotated screen-capture video stream that captures an annotated frame from an annotated reference video stream that is presented on a screen of a test device, according to some illustrative embodiments of the concepts and technologies described herein.

Turning now to FIG. 1E with reference to FIG. 1A, an embodiment of an annotated screen-capture video stream that captures an annotated frame from an annotated reference video stream that is presented on a screen of a test device is disclosed, according to the concepts and technologies described herein. In some embodiments, the annotated reference video stream 151' can be used for objective testing in lieu of using the ABR video stream 167, such as when the ABR video stream 167 is not available and/or the system 100 has a streaming server, such as the streaming server 161, that can support delivery of the annotated reference video stream 151' to one or more of the test devices 102. As discussed with respect to FIG. 1A, an annotated reference video stream, such as the annotated reference video stream 151', is not associated with a reference video signature package, such as the reference video signature package 154, because the annotated reference video stream 151' may only be used when the ABR video stream 167 is not used in the objective testing. In the embodiment shown in FIG. 1E, the objective testing occurs by the annotated reference video stream 151' being delivered to the test device 102 instead of the ABR video stream 167 (which is non-annotated) being delivered to facilitate the objective testing. The video player 168 can execute the annotated reference video stream 151' and display or otherwise present the annotated frame 152A', the annotated marker 153, the first numbered row 153A, and the second numbered row 153B on the screen 170 of the test device 102. The video player 168 can also provide a time indicator 169 denoting the time segment in which the video player 168 is playing the annotated reference video stream 151'. In this embodiment, the master controller 110 can capture (and/or or initiate the video player 168 to capture) one or more of the annotated frames 152A' of the annotated video stream 151' by screen-capturing what is being displayed on the screen 170 so as to create one or more of the annotated screen-capture frames 130' that can be assembled into an annotated screen-capture video stream 122'. The annotated screen-capture frames 130' can be transmitted to the video processing server 108 via the connector 103.

In some embodiments, when the video processing server 108 assembles the annotated screen-capture frames 130' into the annotated screen-capture video stream 122', the first numbered row 153A and the second numbered row 153B within the annotation marker 153 captured in one or more of the screen-capture frames 130' can undergo optical character recognition via the OCR application 113. The OCR application 113 can analyze the second numbered row 153B of each of the annotated screen-capture frames 130' to determine the level of video quality and/or whether any of the annotated frames 152A' were repeated during the presentation on the test device 102 via discovery of multiple annotated screen-capture frames 130' that contain the same frame number in the second numbered row 153B. By this, the master controller 110 and the OCR application 113 can be used to determine QoE metrics, such as video quality and/or delivery quality, when screen-captures correspond to a reference video stream that is annotated, such as the annotated reference video stream 151'. It must be understood that the above example is illustrative and for clarification purposes only, and therefore should not be construed as being limiting in any way.

Figure 2:
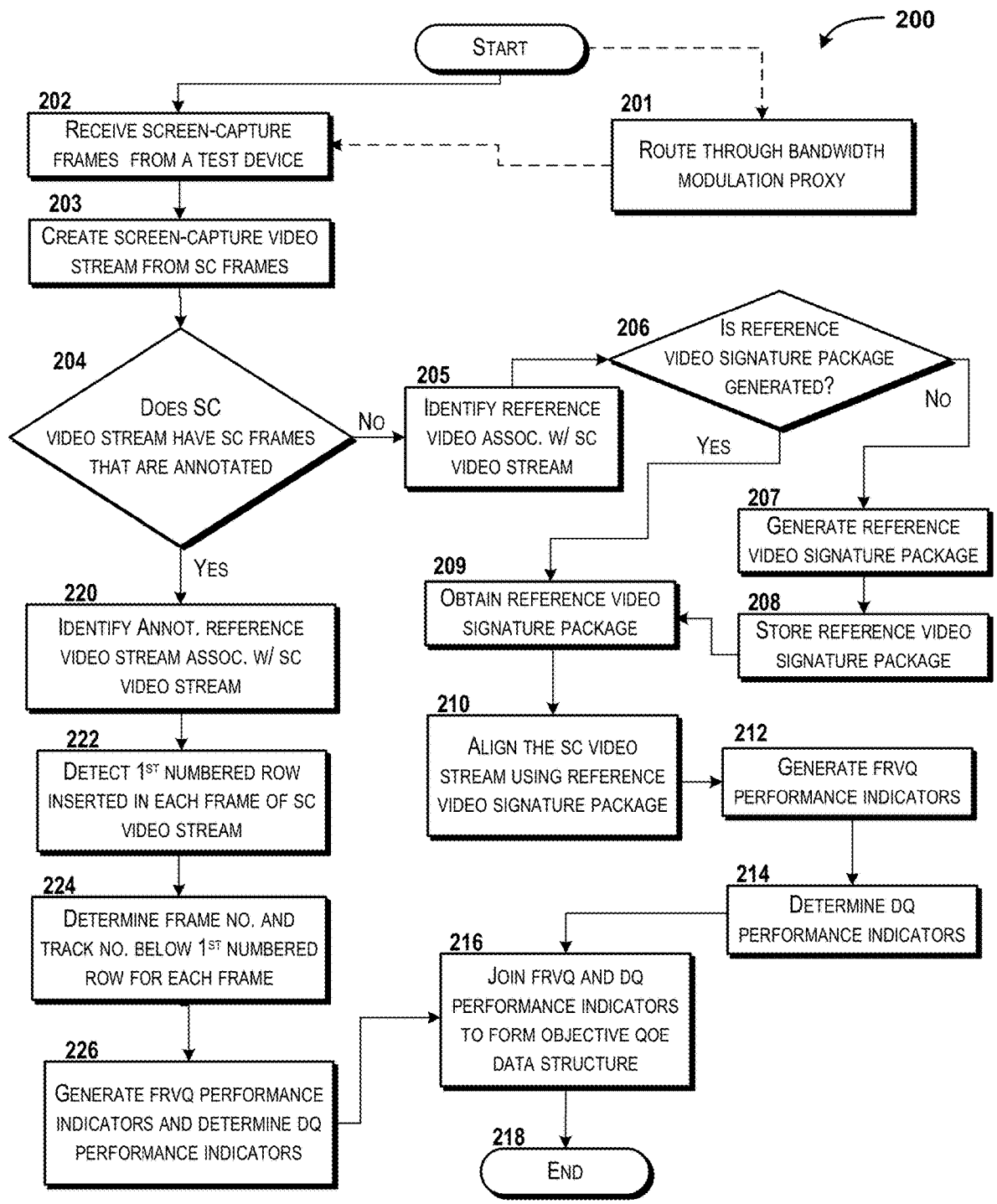
FIG. 2 is a flow diagram showing aspects of a method for adaptive bit rate mobile video objective testing, according to some illustrative embodiments of the concepts and technologies described herein.
Figure 3:
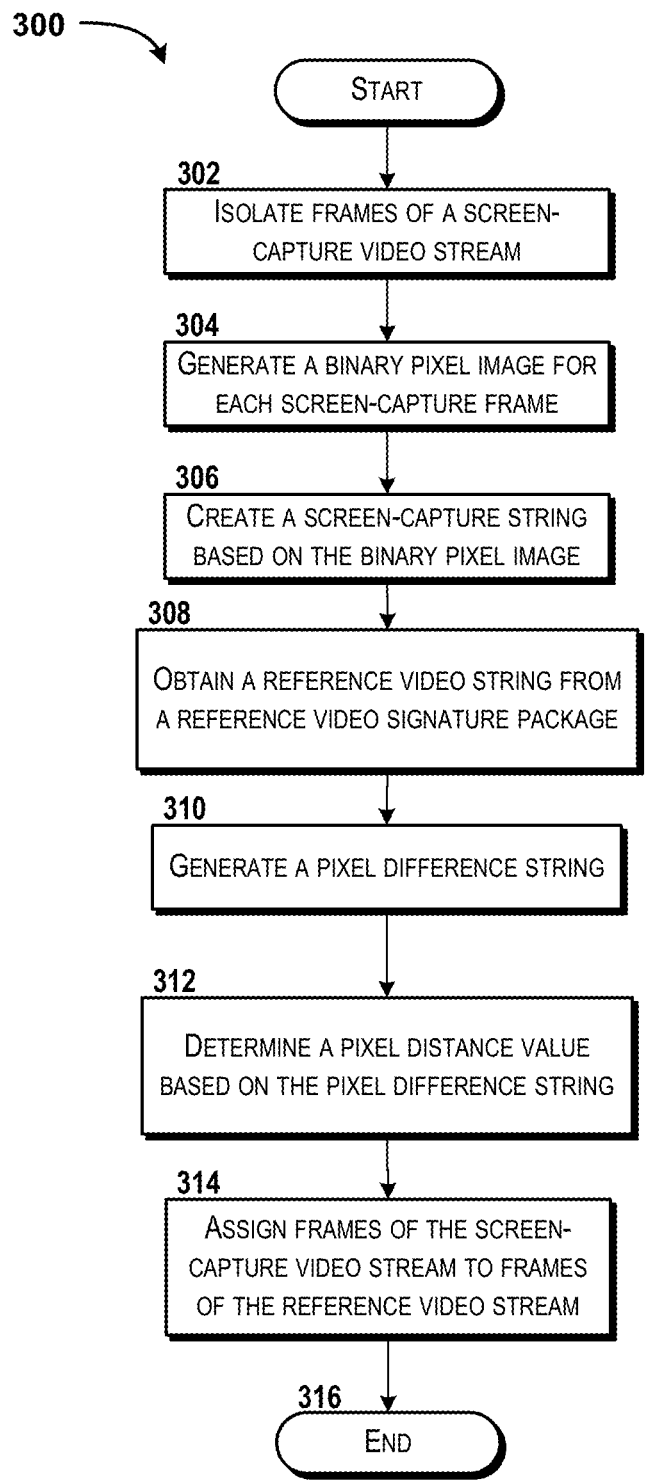
FIG. 3 is a flow diagram showing additional aspects of aligning a screen-capture video stream for adaptive bit rate mobile video objective testing, according to an illustrative embodiment of the concepts and technologies described herein.

Turning now to FIG. 2 and FIG. 3, illustrative embodiments of a method 200 and a method 300 are respectively disclosed, according to embodiments of the present disclosure. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the test device 102, the bandwidth modulation proxy 164, the data store 150, a computer system of the ABR video stream provider 166, the streaming server 161, the converter 104, the switch 106, and/or the video processing server 108, to perform one or more operations and/or causing the processor to direct other components of the system or devices to perform one or more of the operations.

For purposes of illustrating and describing the concepts of the present disclosure, the method 200 and the method 300 are described herein as being performed by the video processing server 108 via execution of one or more computer instructions and/or software modules such as, for example, the master controller 110. It should be understood that additional and/or alternative devices and/or network nodes can provide the functionality described herein via execution of one or more modules, applications, and/or other software including, but not limited to, the video player 168 or OCR application 113. Thus, the illustrated embodiments are illustrative, and should not be viewed as being limiting in any way.

Turning now to FIG. 2, the method 200 for ABR mobile video objective testing is disclosed, according to an illustrative embodiment of the present disclosure. In some embodiments, the method 200 can optionally begin with operation 201.

At operation 201, the video processing server 108 executing, via the processor 112, the master controller 110 can command the video player 168 of the test device 102 to request the ABR video stream 167 for execution and display. The video processing server 108 executing the master controller 110 can activate the bandwidth modulation proxy 164. The bandwidth modulation proxy 164 can, in some embodiments, intercept the ABR video stream 167 and route the ABR video stream 167 to a computer system of the bandwidth modulation proxy 164, which in turn can be used to apply a bandwidth modulation profile to emulate congestion on the network 160. In some embodiments, the bandwidth modulation proxy 164 can emulate congestion on the network 160 without having to route the ABR video stream 167 through a computer system of the bandwidth modulation proxy 164, such as by applying constraining factors to the ABR video stream 167 while the ABR video stream 167 is being delivered to the test device 102. From the optional operation 201, the method 200 can continue to operation 202.

At operation 202, the test device 102 can capture frames 167D from the ABR video stream 167 being executed and displayed on the screen 170 of the test device 102 via the generation of screen-capture frames 130. The video processing server 108 can receive the screen-capture frames 130 from the test device 102, where each of the screen-capture frames corresponds to a respective frame 167D of the ABR video stream 167 being executed and displayed on the screen 170 of the test device 102. The screen-capture frames 130 can be received in the order in which the frames 167D were displayed on the test device 102.

From operation 202, the method 200 proceeds to operation 203, where the video processing server 108 can use the screen-capture frames 130 to create the screen-capture video stream 122. Thus, the screen-capture video stream 122 can include the screen-capture frames 130. In some embodiments, the screen-capture video stream 122 can include a plurality of screen-capture tracks 124, where each of the plurality of screen-capture tracks 124 can include audio data, such as the audio data 128, and video data, such as the video data 126, that corresponds with a quality level, such as a level of video quality. Once the frames 167D of ABR video stream 167 have been captured in the screen-capture frames 130 and the screen-capture video stream 122 has been created using the screen-captures (e.g., the screen-capture frames 130), the method 200 can proceed to operation 204.

At operation 204, the method 200 continues with the master controller 110 determining whether the screen-capture video stream, such as the screen-capture video stream 122, corresponds to a reference video stream that is annotated, such as the annotated reference video stream 151', or is non-annotated, such as the reference video stream 151. For clarification purposes only, a discussion of operation 204 proceeding to operation 220 will be provided first. In response to determining that the frames captured and received during operation 202 correspond to the annotated reference video stream 151', the method 200 proceeds to operation 220, where the master controller 110 identifies the annotated reference video stream 151' that is associated with the annotated screen-capture video stream 122'. The identification of the annotated reference video stream 151' can be used to retrieve a unique identifier so as to label the annotated screen-capture video stream 122' according to the video content contained therein (e.g., the title of the movie or television show).

From operation 220, the method 200 can proceed to operation 222, where the master controller 110 can call the OCR application 113 to execute, and the OCR application 113 can detect a first numbered row that is inserted or overlaid in the annotation marker of the annotated frame, such as the first numbered row 153A within the annotation marker 153 of the annotated frame 152A'. The first numbered row 153A can include template digits.

From operation 222, the method 200 can proceed to operation 224, where the master controller 110 can determine a frame number and a track number that has been inserted and/or overlaid as a second numbered row which is located below the first numbered row, such as the second numbered row 153B located below the first numbered row 153A. In some embodiments, the master controller 110 can prompt the OCR application 113 to execute and provide optical character recognition for the template digits in the first numbered row 153A and the frame number and track number in the second numbered row 153B, where the track number in the second numbered row 153B indicates a level of video quality.

From operation 224, the method 200 can proceed to operation 226, where the master controller 110 can use the OCR analysis from operation 224 to generate full-reference video quality performance indicators, such as the FRVQ performance indicators 138, and determine delivery quality performance indicators, such as the DQ performance indicators 140. For example, the master controller 110 can use the frame numbers from the second numbered row 153B to check whether the annotated frames 152A' have been repeated, and sum the total amount of repeated frames to generate the DQ performance indicator 140. In some embodiments, only repeated frames that are contiguous repetitions over a repetition threshold are summed to generate the DQ performance indicator 140. The master controller 110 can use the OCR analysis of the second numbered row 153B from the operation 224 to identify the track numbers (which indicate a level of video quality) in order to create the FRVQ performance indicator 138.

From operation 226, the method 200 can proceed to operation 216, where the master controller 110 can join together the FRVQ performance indicator 138 and the DQ performance indicator 140 created based on the OCR analysis from the OCR application 113 so as to form an objective quality of experience data structure. From operation 216, the method 200 can proceed to operation 218. At operation 218, the method 200 can end.

Returning back to operation 204, in response to determining that the frames captured and received during operation 202 correspond to a reference video stream that is non-annotated, such as the reference video stream 151, (and thus the screen-capture video stream 122 corresponds with the reference video stream 151) the method 200 proceeds to operation 205, where the master controller 110 can identify the unique identifier of the reference video stream that is associated with the screen-capture video stream, such as the unique identifier of the reference video stream 151 that corresponds with, and thus is associated with, the screen-capture video stream 122. The unique identifier may be a title or name of the underlying video content that was provided in the ABR video stream 167 and thus also reflected in the reference video stream 151.

From operation 205, the method 200 can proceed to operation 206, where the master controller 110 can use the unique identifier determined from operation 205 to determine whether a reference video signature package has been generated for the reference video stream, such as the reference video signature package 154 for the reference video stream 151. If a determination is made that the reference video package 154 has been generated for the reference video stream 151, the method 200 proceeds to operation 209, where the master controller 110 can obtain the reference video signature package 154 from a storage device. For example, in some embodiments, the master controller 110 can obtain the reference video signature package 154 from the memory 120. In other embodiments, the master controller 110 initiates a request to a remote data store and then receives the reference video signature package 154.

From operation 209, the method 200 can proceed to operation 210, where the master controller 110 can use the reference video signature package 154 to align the screen-capture video stream 122 to the reference video stream 151 without obtaining, retrieving, and/or referencing the reference video stream 151 during performance of the alignment. To align the screen-capture video stream 122, in some embodiments, the master controller 110 can compare one or more of the reference video strings 158 with a screen-capture video string 134, which in turn can be used to create one or more of the pixel difference strings 137. The pixel difference strings 137 can be used to create pixel distance values 136, which the master controller 110 compares to identify the pixel difference string 137 yielding the lowest pixel distance value 136, thereby providing alignment between the screen-capture video stream 122 without obtaining, referencing, retrieving, and/or otherwise acquiring a source video, such as the source video 165, and/or the reference video stream 151 during performance of the alignment and/or objective testing. Further discussion of an embodiment for aligning the screen-capture video stream 122 with the reference video stream 151 using the reference video signature package 154 is discussed below with respect to FIG. 3.

From operation 210, the method 200 can proceed to operation 212, where the master controller 110 generates the FRVQ performance indicators 138 for the screen-capture video stream 122 based on the reference video signature package 154. Examples of the FRVQ performance indicators 138 can include, but are not limited to a spatial resolution indicator 138A, a frame rate indicator 138B, a compression artifacts indicator 138C, and/or a pixel depth indicator 138D. Generation of the FRVQ performance indicators 138 using the reference video signature package 154 can occur based on the techniques discussed with respect to FIG. 1A.

From operation 212, the method 200 can proceed to operation 214, where the master controller 110 determines the DQ performance indicators 140 for the screen-capture video stream 122 based on the reference video signature package 154. Examples of the DQ performance indicators 140 include, but are not limited to, a video startup time indicator 140A, a video stall indicator 140B, a rate switching indicator 140C, and/or a latency indicator 140D. Generation of the DQ performance indicators 140 using the reference video signature package 154 can occur based on the techniques discussed with respect to FIG. 1A. From operation 214, the method 200 can proceed to operation 216.

When operation 216 is preceded by operation 214, master controller 110 can take the FRVQ performance indicators 138 and the DQ performance indicators 140 that were generated based on the reference video signature package 154 and join them to form an objective QoE data structure 142, such as discussed above with respect to FIG. 1A.

From operation 216, the method 200 can proceed to operation 218. At operation 218, the method 200 can end.

Turning back to operation 206, if a determination is made that the reference video signature package 154 has not been generated for the reference video stream 151, the method 200 proceeds to operation 207, where the master controller 110 can generate, or request another computer system to generate, the reference video signature package 154 for the reference video stream 151. The reference video signature package 154 can include time stamps and reference video strings, such as the time stamps 156 and the reference video strings 158.

From operation 207 the method 200 proceeds to operation 208, where the master controller 110 can store the reference video signature package 154 in a storage device, such as the memory 120. From operation 208, the method 200 can proceed to operation 209 and continue as described above.

Turning now to FIG. 3, the method 300 for enabling alignment of a screen-capture video stream for adaptive bit rate mobile video objective testing is disclosed, according to an illustrative embodiment of the present disclosure.

The method 300 begins at operation 302, where the processor 112 executing the master controller 110 can isolate a screen-capture frame 130 of the screen-capture video stream 122. The isolation of the screen-capture frame 130 can allow for individual analysis of the video data 126 contained therein. In some embodiments, the master controller 110 isolates more than one of the screen-capture frames 130 by separating the screen-capture frames 130 into a reserved location register of the memory 120. In some embodiments, before generating a binary pixel image, the master controller 110 may determine that the screen-capture frame 130 of the screen-capture video stream 122 has been decoded to a lower spatial resolution and level of video quality than reflected in the non-annotated frames 152A of the reference video stream 151. Based on the determination that decoding has occurred, the master controller 110 can initiate spatial down sampling of the screen-capture frame 130 so that a lower spatial resolution is created within the screen-capture frames 130 prior to generation of the binary pixel image 132. This may reduce the amount of compensation used to correct for pixel distortion.

From operation 302, the method 300 can proceed to operation 304, where the master controller 110 executing on the processor 112 can generate a binary pixel image 132 for each of the one or more screen-capture frames 130 that was isolated. In some embodiments, the generation of the binary pixel image 132 is used to compensate for pixel distortion that is determined to exist on the screen-capture frame 130 of the screen-capture video stream 122. In some embodiments, the master controller 110 can generate a binary pixel image, such as the binary pixel image 132, by generating a color histogram of the color channels (e.g., R, G, and B or Y, U, and V) from the values of one or more of the pixels in the screen-capture frames 130 of the screen-capture video stream 122. The master controller 110 can establish a screen-capture threshold value for each of the color channels based on the color histogram pertaining to the screen-capture frames 130 of the screen-capture video stream 122. In some embodiments, the screen-capture threshold value can correspond to a peak value of the color histogram for one of the color channels (e.g., for one or more of the R, G, B, and/or Y, U, V). In other embodiments, the screen-capture threshold value can correspond to an average value of the color histogram for one of the color channels. Using the screen-capture threshold values, the master controller 110 can convert colored pixels into a pixel that corresponds with a binary color (e.g., black or white).

In some embodiments, a color pixel of the screen-capture frame 130 can be converted to a black pixel when the pixel's values for each color channel is below each of the corresponding screen-capture threshold values, else color pixel is converted to a white pixel. For example, when a color pixel's value for every color channel (e.g., R, G, B or Y, U, V) is equal to or below the corresponding screen-capture threshold values, then the color pixel can be converted by the master controller 110 to a black pixel, which in turn can be assigned or converted to a value of "0," as explained below; however, if not every pixel value for each color channel component is equal to or below the corresponding screen-capture threshold values (e.g., at least one pixel value for a color channel being above a screen-capture threshold value) then the color pixel is converted to a white pixel (which can be assigned a value of "1"). In an alternate embodiment, a color pixel of the screen-capture frame 130 can be converted to a white pixel (which can be assigned a value of "1") when the pixel's value for each color channel is above each of the corresponding screen-capture threshold values, else the color pixel is converted to a black pixel. For example, when a color pixel's value for each color channel (e.g., R, G, and B) are each above the screen-capture threshold values corresponding to R, G, and B, then the color pixel can be converted by the master controller 110 to a white pixel, which in turn can be assigned or converted to a value of "1;" however if not every pixel value for R, G, and B is above each of the corresponding reference threshold values (e.g., at least one pixel value for a color channel being at or below the screen-capture threshold value for that color channel) then the color pixel is converted to a black pixel. In yet another embodiment, for example, when the pixel of the screen-capture frame 130 has values corresponding to YUV, and thus is analyzed in terms of YUV, the master controller 110 can determine whether the pixel's Y value (for luminance) is at or below the corresponding screen-capture threshold value for luminance, and if so (i.e., if the pixel's Y value is at or below the screen-capture threshold value for luminance), then the color pixel is converted to a black pixel (or "0"), but if not (i.e., if the pixel's Y value is above the screen-capture threshold value for luminance), then the color pixel is converted to a white pixel (or "1"). It is understood that these are examples and should not be construed as limiting in any way. The conversion by the master controller 110 can be performed for one or more (or each) pixel of the screen-capture frame 130. By this, the pixels contained in the screen-capture frames 130 in the screen-capture video stream 122 can be converted to a binary color (i.e., black or white), thereby generating a binary pixel image, such as the binary pixel image 132, that can contain pixels of binary colors. By generating the binary pixel images 132, the video processing server 108 can compensate for pixel distortion, reduce loads on the processor 112, and reduce storage utilization of the memory 120.

From operation 304, the method can continue to operation 306, where the master controller 110 can create a screen-capture video string 134 (also referred to as "screen-capture string") that is based on the binary pixel image 132 that was generated from one of the screen-capture frames 130. Each screen-capture video string 134 corresponds to a screen-capture frame 130 received from the test device 102. In some embodiments, the screen-capture video string 134 can be created in response to the binary pixel image 132 that was generated at operation 304. The screen-capture video string 134 can be a bit string that has a sequence of binary digits (e.g., "0" or "1"), where each binary digit in the sequence is associated with a converted pixel in the binary pixel image 132. Each pixel in the binary pixel image 132 can correspond with one bit of storage in the screen-capture video string 134 (e.g., each pixel corresponding to a binary digit of 1 or 0). For example, at least some of the converted pixels can be assigned a binary digit of "0" or "1," where, for example, a black pixel can assigned to "0" while a white pixel is assigned to "1," or vice-versa. The screen-capture video string 134 can assemble the binary digits into a specific sequence that has a defined amount of binary digits ("bit length"), such as bit length of 64 bits. Each of the reference video strings 158 can be uniform in bit length, and therefore, the master controller 110 can define the screen-capture video strings 134 with a bit length that matches that of the reference video strings 158. Put simply, the reference video strings 158 and the screen-capture video strings 134 can have the same bit length, such as 32 bits, 64 bits, 128 bits, or another defined length. Thus, one screen-capture video string 134 can be based on one of the screen-capture frames 130 of the screen-capture video stream 122. As such, the screen-capture video string 134 will correspond to a screen-capture frame 130. In some embodiments, multiple screen-capture video strings 134 can correspond to one screen-capture frame 130. The screen-capture video strings 134 can be configured for comparison with one or more of the reference video strings 158, such as by the master controller 110 ensuring that the bit lengths between the screen-capture video strings 134 and the reference video strings 158 match before a comparison occurs.

From operation 306, the method 300 can proceed to operation 308, where operation 308, the master controller 110 executing on the processor 112 can obtain a reference video string 158 of the reference video signature package 154 from a data storage device, such as the memory 120. The reference video string 158 can be a sequence of bits and be the same bit length as the screen-capture video string 134. The reference video string 158 can be compared with the screen-capture video string 134 to identify differences in the binary digits at each location along the bit length.

From operation 308, the method 300 can proceed to operation 310, where the master controller 110 executing on the processor 112 can generate a pixel difference string 137 based on a comparison between the screen-capture video string 134 and the reference video string 158. The master controller 110 can implement an exclusive "OR" bit operation (referred to as "XOR" command) to conduct the comparison. For example, when the master controller 110 detects a difference in digits at the same location in each of the screen-capture video string 134 and the reference video string 158 (e.g., a "1" and "0" or "0" and "1"), then a binary digit can be inserted at the same location of the pixel difference string 137 as was analyzed for the screen-capture video string 134 and the reference video string 158, such as insertion of the binary digit of "1." Conversely, a bit value of "0" can be inserted when a match is detected at the same location of the pixel different string 137 as was analyzed in each of the screen-capture video string 134 and the reference video string 158 (e.g., "0"-"0" or "1"-"1").

From operation 310, the method 300 can proceed to operation 312, where the master controller 110 executing on the processor 112 can determine a pixel distance value 136 based on the pixel difference string 137. For example, the master controller 110 can calculate the pixel distance value 136 by adding the sequence of bits in the pixel difference string 137. If the binary digit of "1" was used to indicate a different and the binary digit of "0" was used to indicate a match, then the larger the number calculated for the pixel distance value 136 will correspond with a lower likelihood that a match exists between a screen-capture frame 130 of the screen-capture video stream 122 and one of the non-annotated frames 152A that is being compared; whereas the smaller the number calculated for the pixel distance value 136 will correspond with a higher likelihood that a match exists between a screen-capture frame 130 of the screen-capture video stream 122 and one of the non-annotated frames 152A that is being compared. This is because a larger number coincides with a great pixel disparity, and thus a lower likelihood of a match between the images being compared. The lowest number calculated for the pixel distance value 136 designates a match, and thus alignment, between screen-capture frame 130 of the screen-capture video stream 122 and one of the non-annotated frames 152A that was used for the comparison.

From operation 312, the method 300 can proceed to operation 314, where the master controller 110 executing on the processor 112 can assign the screen-capture frame 130 of the screen-capture video stream 122 to a non-annotated frame 152A of the reference video stream 151 based on the pixel distance value 136 that provides the lowest number. For example, the pixel distance value 136 that has the lowest value can indicate a match between the screen-capture frames 130 of the screen-capture video stream 122 to one or more non-annotated frames 152A of the reference video stream 151, thereby indicating that an association and/or assignment can be made, thereby allowing for temporal alignment between the screen-capture frames 130 of the screen-capture video stream 122 and the non-annotated frames 152A of the reference video stream 151 to occur. The master controller 110 can assign the screen-capture frame 130 of the screen-capture video stream 122 to one of the non-annotated frames 152A of the reference video stream 151 based on the non-annotated frame 152A that corresponds with one of the reference video strings 158 providing the lowest pixel distance value 136 upon comparison. Assigning the screen-capture frame 130 of the screen-capture video stream 122 can align the screen-capture video stream 122 with the reference video stream 151. From operation 314, the method 300 can proceed to operation 316. The method 300 can end at operation 316.

Figure 4:
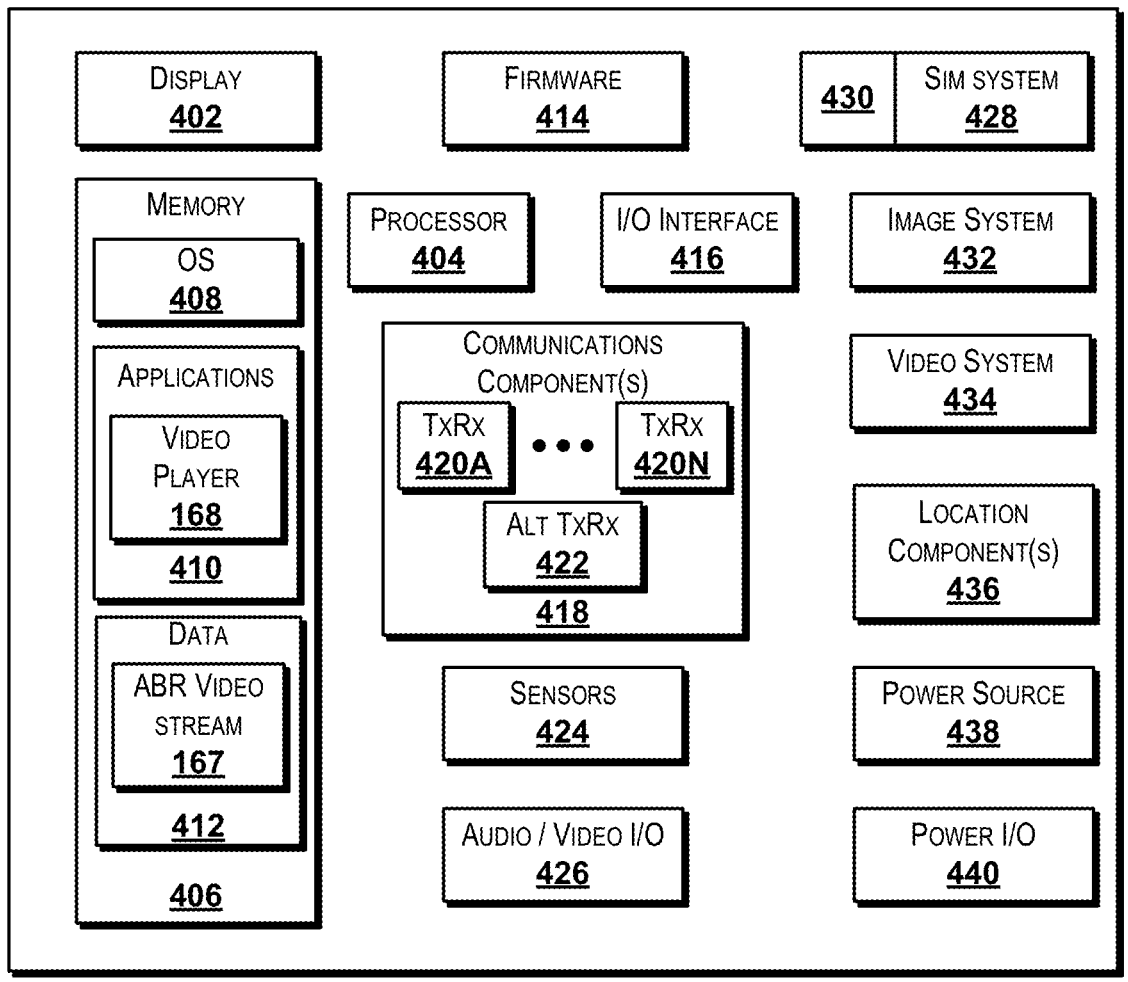
FIG. 4 is a block diagram illustrating an example test device configured to enable adaptive bit rate mobile video objective testing, according to some illustrative embodiments of the concepts and technologies described herein.

Turning now to FIG. 4, an illustrative test device 400 and components thereof will be described. In some embodiments, the test devices 102A-102N described above with reference to FIGS. 1A-1E and FIGS. 2-3 can be configured as and/or can have an architecture similar or identical to the test device 400 described herein in FIG. 4. It should be understood, however, that the test device 102 may or may not include all of the functionality described herein with reference to FIG. 4. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments of the present disclosure can be implemented, and should not be construed as being limiting in any way.

As illustrated in FIG. 4, the test device 400 can include a display 402 (i.e., a screen) for displaying data. According to various embodiments, the display 402 can be configured to display various graphical user interface ("GUI") elements and/or video streams such as, for example without limitation, an ABR video stream 167, a screen-capture video stream 122, a screen-capture frame 130, a reference video stream 151, an annotated frame 152A', a non-annotated frame 152A, controls of the video player 168, a time indicator 169, settings screens, preferences screens, various parameters, text, images, video, virtual keypads and/or keyboards, messaging data, notification messages, metadata, internet content, device status, time, date, calendar data, device preferences, map and location data, combinations thereof, and/or the like. The test device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410 such as application programs, for example without limitation, video player 168 described above, other computer-executable instructions stored in a memory 406, or the like. In some embodiments, the applications 410 also can include a UI application (not illustrated in FIG. 4).

The UI application can interface with the operating system 408, that can be executing on the test device 102 shown in FIG. 1A, to facilitate user interaction with functionality, playing of a video stream (e.g., an ABR video stream 167) and/or data stored at the test device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application and/or the video player 168 can be executed by the processor 404 to aid a user in entering and/or displaying content, to configure one or more parameters for enabling video streaming and display of the ABR video stream 167, for configuring settings, for manipulating address book content and/or settings, to provide multimode interaction, for interacting with other applications 410, and otherwise facilitating user interaction with the operating system 408, the applications 410, and/or other types or instances of data 412 that can be stored at the test device 400. The data 412 can include, for example, the application programs such as the video player 168, the ABR video stream 167, and/or other applications or program modules. According to various embodiments, the data 412 can include, for example, presence applications, audio applications, streaming applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404.

It can be appreciated that, at least by virtue of storage of the instructions corresponding to the applications 410 and/or other instructions embodying other functionality illustrated and described herein in the memory 406, and/or by virtue of the instructions corresponding to the applications 410 and/or other instructions embodying other functionality illustrated and described herein being accessed and/or executed by the processor 404, the test device 400 is a special-purpose mobile device that can facilitate providing the functionality illustrated and described herein. The firmware 414 also can store code for execution during device power up and power down operations. It can be appreciated that the firmware 414 can be stored in a volatile or non-volatile data storage device including, but not limited to, the memory 406 and/or a portion thereof.

The test device 400 also can include an input/output ("I/O") interface 416. The I/O interface 416 can be configured to support the input/output of data such as the ABR video streams 167, the screen-capture video streams 122, the objective QoE data structures 142, the reference video signature packages 154, or other data stored in the memory 120. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the test device 400 can be configured to synchronize with another device to transfer content to and/or from the test device 400. In some embodiments, the test device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the test device 400 and a network device or local device.

The test device 400 also can include a communications component 418. The communications component 418 can be configured to interface with the processor 404 to facilitate wired and/or wireless communications with one or more networks such as the network 160 described herein. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using GSM, CDMAONE, CDMA2000, LTE, and various other 2G, 2.5G, 3G, 4G, 5G and greater generation technology standards. Moreover, the communications component 418 may facilitate communications over various channel access methods (which may or may not be used by the aforementioned standards) including, but not limited to, TDMA, FDMA, W-CDMA, OFDM, SDMA, and the like.

In addition, the communications component 418 may facilitate data communications using GPRS, EDGE, the HSPA protocol family including HSDPA, EUL or otherwise termed HSDPA, HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The test device 400 also can include one or more sensors 424. The sensors 424 can include temperature sensors, light sensors, air quality sensors, movement sensors, orientation sensors, noise sensors, proximity sensors, or the like. As such, it should be understood that the sensors 424 can include, but are not limited to, accelerometers, magnetometers, gyroscopes, infrared sensors, noise sensors, microphones, combinations thereof, or the like. Additionally, audio capabilities for the test device 400 may be provided by an audio I/O component 426. The audio I/O component 426 of the test device 400 can include one or more speakers for the output of audio signals, one or more microphones for the collection and/or input of audio signals, and/or other audio input and/or output devices.

The illustrated test device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the test device 400 are contemplated, it should be understood that these embodiments are illustrative, and should not be construed as being limiting in any way.

The test device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The test device 400 may also include a video system 434. The video system 434 can be configured to capture, process, record, modify, and/or store video content. The video system 434 can execute in parallel with and/or supplement the video player 168. Photos and videos obtained using the image system 432 and the video system 434, respectively, may be added as message content to an MMS message, email message, and sent to another test device, such as a mobile device. The video and/or photo content also can be shared with other devices via various types of data transfers via wired and/or wireless communication devices as described herein.

The test device 400 also can include one or more location components 436. The location components 436 can be configured to send and/or receive signals to determine a geographic location of the test device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 also can be configured to communicate with the communications component 418 to retrieve triangulation data for determining a location of the test device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the test device 400. Using the location component 436, the test device 400 can generate and/or receive data to identify its geographic location, or to transmit data used by other devices to determine the location of the test device 400. The location component 436 may include multiple components for determining the location and/or orientation of the test device 400.

The illustrated test device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the test device 400 can include additional and/or alternative components, the above embodiment should be understood as being illustrative of one possible operating environment for various embodiments of the concepts and technologies described herein. The described embodiment of the test device 400 is illustrative, and should not be construed as being limiting in any way.

Figure 5:
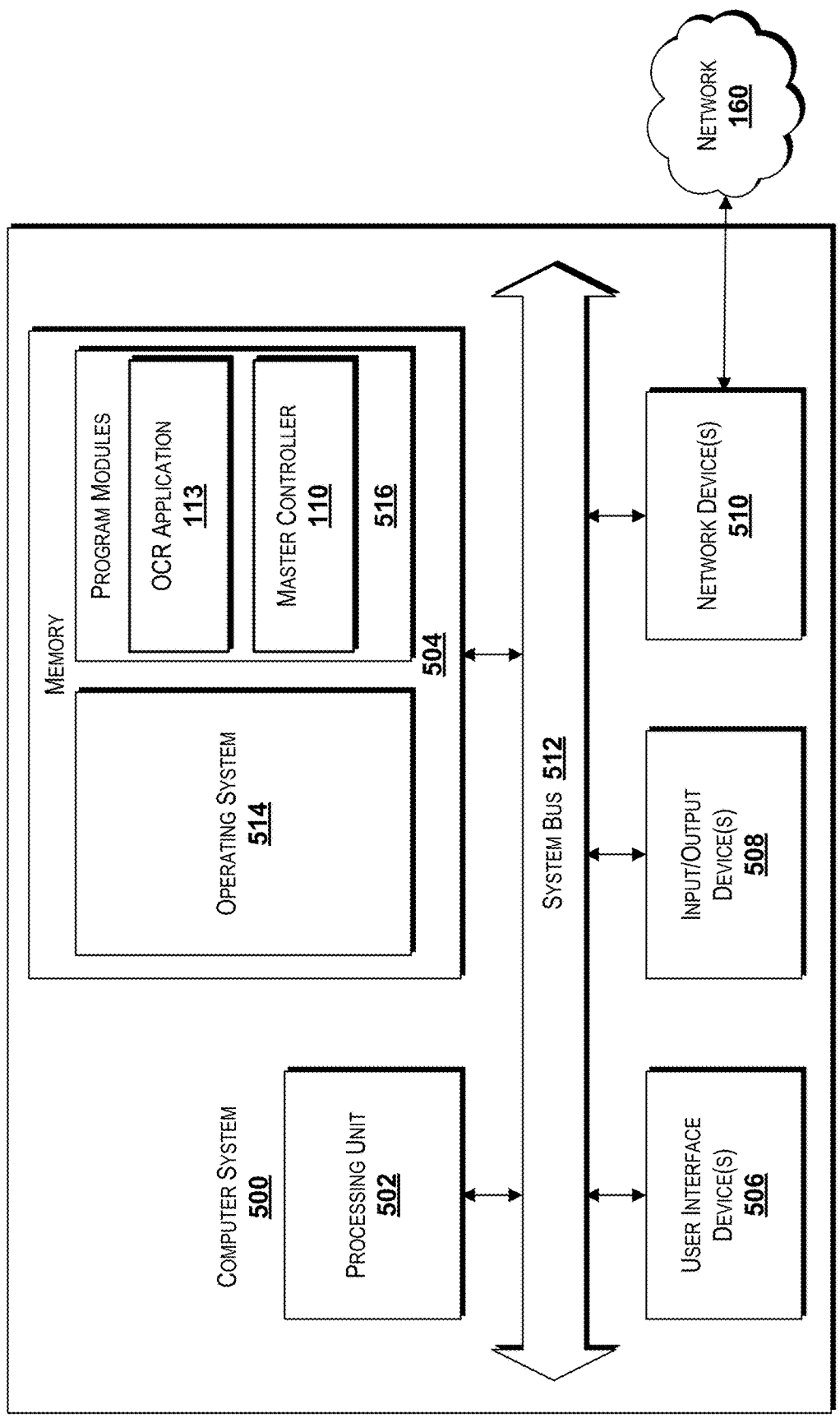
FIG. 5 is a block diagram illustrating an example computer system configured to enable adaptive bit rate mobile video objective testing, according to some illustrative embodiments of the concepts and technologies described herein.

FIG. 5 is a block diagram illustrating a computer system 500 configured to provide the functionality described herein for enabling access to restricted data using geofences, in accordance with various embodiments of the concepts and technologies disclosed herein. The video processing server 108 can be an embodiment of the computer system 500. The computer system 500 includes a processing unit 502, a memory 504, one or more user interface devices 506, one or more input/output ("I/O") devices 508, and one or more network devices 510, each of which is operatively connected to a system bus 512. The system bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 can include the OCR application 113, the master controller 110, and/or other applications, routines, or services. These and/or other programs can be embodied in computer-readable media containing instructions that, when executed (i.e., in response to execution) by the processing unit 502, perform one or more of the methods 200 and 300 described in detail above with respect to FIGS. 2-3 and/or other functionality as illustrated and described herein. It can be appreciated that, at least by virtue of the instructions embodying the methods 200 and 300, and/or other functionality illustrated and described herein being stored in the memory 504 and/or accessed and/or executed by the processing unit 502, the computer system 500 is a special-purpose computing system that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store a reference video stream 151 (including the non-annotated frames 152A), an annotated reference video stream 151', a reference video signature package 154 (along with the contents included therein, such as the time stamps 156 and the reference video strings 158), a screen-capture video stream 122, a binary pixel image 132, a screen-capture video string 134, a pixel distance value 136, a FRVQ performance indicator 138, a DQ performance indicator 140, an objective QoE data structure 142, an annotated screen-capture video stream 122' and/or other data, or any combination thereof if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 160. Examples of the network devices 510 include, but are not limited to, a modem, a radio frequency ("RF") or infrared ("IR") transceiver, a telephonic interface, a bridge, a router, or a network card. The network 160 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 160 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
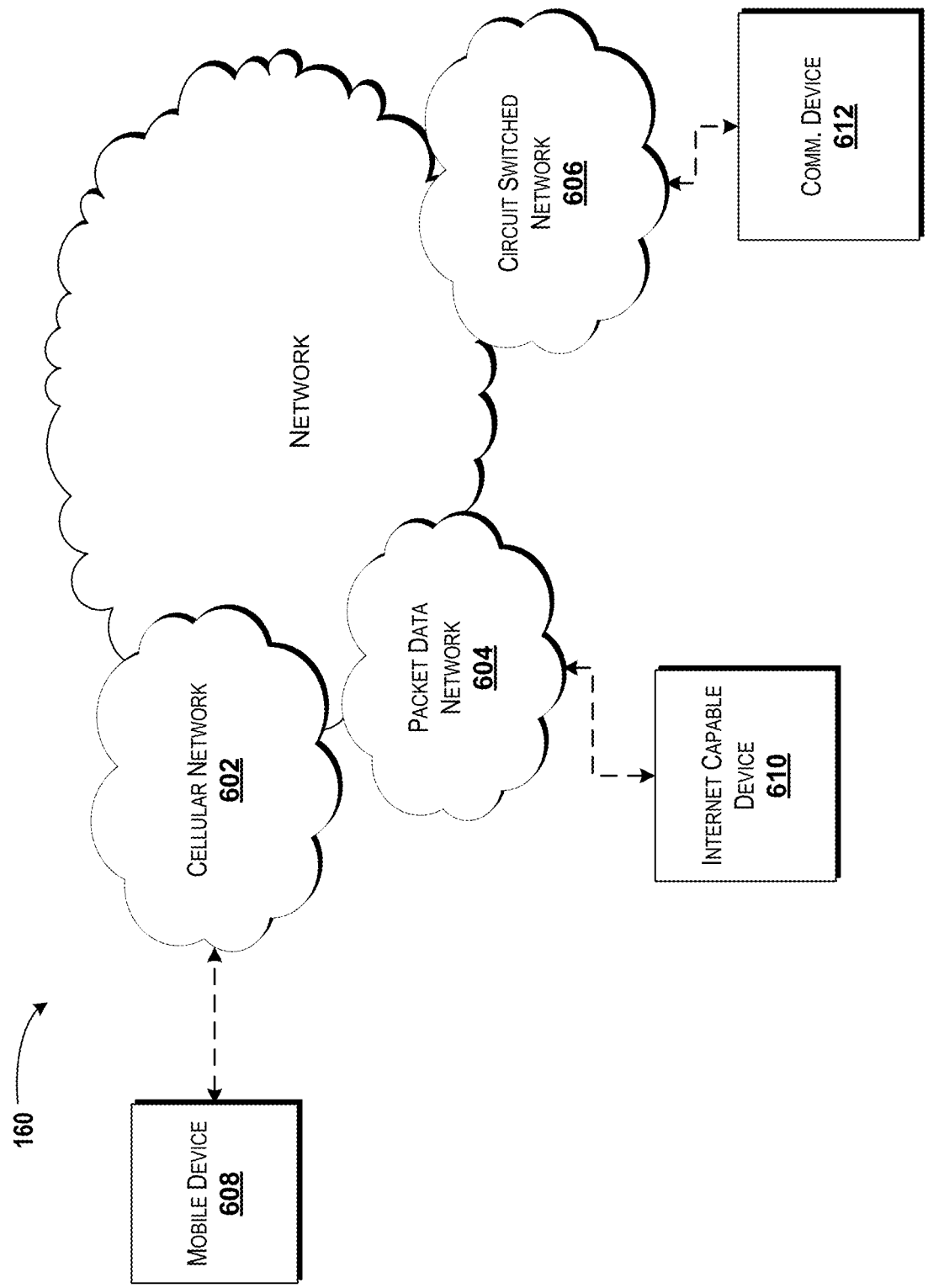
FIG. 6 schematically illustrates a network that can be used in adaptive bit rate mobile video objective testing, according to an illustrative embodiment of the concepts and technologies described herein.

Turning now to FIG. 6 with reference to FIG. 1, additional details of the network 160 are illustrated, according to an illustrative embodiment. It is understood that embodiments of the test device 102 discussed with respect to FIG. 1A can include one or more of the mobile communication device 608, the internet-capable device 610, the communication device 612, or a combination thereof. The network 160 can be referred to as communication network. The network 160 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. In is understood that in some embodiments, test device 102 can be a mobile device 608. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards. In some embodiments, the cellular network 602 may be a referred to as a network due to the cellular network 602 providing wireless communication coverage across a range of geographical locations.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. In some instances, the requesting device includes software (e.g., a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. For example, in some embodiments, test device 102 can be a mobile device 608, an Internet-capable device 610, and/or a communication device 612. In some embodiments, the mobile device 608, the Internet-capable device 610, and/or the communication device 612 described herein in FIG. 6 can be configured as and/or can have an architecture similar or identical to the test device 400 described above in FIG. 4. In the specification, the network 160 is used to refer broadly to any combination of the networks 602, 604, 606. It should be appreciated that substantially all of the functionality described with reference to the network 160 can be performed by the cellular network 602, the packet data network 604, and/or the circuit switched network 606, alone or in combination with other networks, network elements, and the like.

Based on the foregoing, it should be appreciated that autonomous self-powered squeezed-light temperature regulation systems and methods have been disclosed herein. Although the subject matter presented herein has been described in language specific to thermodynamic, electrical, and/or computer structural features, methodological and transformative acts, specific thermodynamic, electrical, and/or computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, in response to being executed by the processor, cause the processor to perform operations comprising:
   creating a screen-capture video stream comprising a plurality of screen-capture frames, wherein each of the plurality of screen-capture frames corresponds to a respective frame being presented on a screen of a test device,
   determining that a direct comparison between the screen-capture video stream and a reference video stream cannot be performed,
   determining that the screen-capture video stream includes annotated screen-capture frames within the plurality of screen-capture frames, and
   generating full reference video quality performance indicators for the screen-capture video stream.

2. The system of claim 1, wherein the operations further comprise:
   determining delivery quality performance indicators for the screen-capture video stream, and
   joining the full reference video quality performance indicators and the delivery quality performance indicators to form an objective quality of experience data structure.

3. The system of claim 2,
   wherein the full reference video quality performance indicators comprise one or more of a spatial resolution indicator, a frame rate indicator, a compression artifacts indicator, and a pixel depth indicator, and
   wherein the delivery quality performance indicators comprise one or more of a video startup time indicator, a video stall indicator, a rate switching indicator, and a latency indicator.

4. The system of claim 1, wherein determining that the screen-capture video stream includes annotated screen-capture frames within the plurality of screen-capture frames comprises detecting an annotation marker within the plurality of screen-capture frames.

5. The system of claim 1, wherein the screen-capture video stream comprises a plurality of tracks, and wherein each of the plurality of tracks comprises audio data and video data that corresponds with a quality level.

6. The system of claim 1, wherein the operations further comprise:
determining that a screen-capture frame from the plurality of screen-capture frames is non-annotated, and
obtaining a reference video signature package instead of retrieving the reference video stream.

7. The system of claim 1, wherein the operations further comprise:
detecting that a stall in playback has occurred on the test device, and
creating a video stall indicator that provides an amount of stalls present in the screen-capture video stream.

8. A method comprising:
creating, by a system comprising a processor, a screen-capture video stream comprising a plurality of screen-capture frames, wherein each of the plurality of screen-capture frames corresponds to a respective frame being presented on a screen of a test device;
determining, by the system, that a direct comparison between the screen-capture video stream and a reference video stream cannot be performed;
determining, by the system, that the screen-capture video stream includes annotated screen-capture frames within the plurality of screen-capture frames; and
generating, by the system, full reference video quality performance indicators for the screen-capture video stream.

9. The method of claim 8,
determining, by the system, delivery quality performance indicators for the screen-capture video stream; and
joining, by the system, the full reference video quality performance indicators and the delivery quality performance indicators to form an objective quality of experience data structure.

10. The method of claim 9,
wherein the full reference video quality performance indicators comprise a spatial resolution indicator, a frame rate indicator, a compression artifacts indicator, and a pixel depth indicator, and
wherein the delivery quality performance indicators comprise a video startup time indicator, a video stall indicator, a rate switching indicator, and a latency indicator.

11. The method of claim 8, wherein determining that the screen-capture video stream includes annotated screen-capture frames within the plurality of screen-capture frames comprises detecting an annotation marker within the plurality of screen-capture frames.

12. The method of claim 8, wherein the screen-capture video stream comprises a plurality of tracks, and wherein each of the plurality of tracks comprises audio data and video data that corresponds with a quality level.

13. The method of claim 8, further comprising:
determining, by the system, that a screen-capture frame from the plurality of screen-capture frames is non-annotated; and
obtaining, by the system, a reference video signature package instead of retrieving the reference video stream.

14. The method of claim 8, further comprising:
detecting, by the system, that a stall in playback has occurred on the test device; and
creating, by the system, a video stall indicator that provides an amount of stalls present in the screen-capture video stream.

15. A computer storage medium having computer-executable instructions stored thereon that, when executed by a processor, cause the processor to perform operations comprising:
creating a screen-capture video stream comprising a plurality of screen-capture frames, wherein each of the plurality of screen-capture frames corresponds to a respective frame being presented on a screen of a test device;
determining that a direct comparison between the screen-capture video stream and a reference video stream cannot be performed;
determining that the screen-capture video stream includes annotated screen-capture frames within the plurality of screen-capture frames; and
generating full reference video quality performance indicators for the screen-capture video stream.

16. The computer storage medium of claim 15, wherein the operations further comprise:
determining delivery quality performance indicators for the screen-capture video stream; and
joining the full reference video quality performance indicators and the delivery quality performance indicators to form an objective quality of experience data structure.

17. The computer storage medium of claim 16,
wherein the full reference video quality performance indicators comprise one or more of a spatial resolution indicator, a frame rate indicator, a compression artifacts indicator, and a pixel depth indicator; and
wherein the delivery quality performance indicators comprise one or more of a video startup time indicator, a video stall indicator, a rate switching indicator, and a latency indicator.

18. The computer storage medium of claim 15, wherein determining that the screen-capture video stream includes annotated screen-capture frames within the plurality of screen-capture frames comprises detecting an annotation marker within the plurality of screen-capture frames.

19. The computer storage medium of claim 15, wherein the screen-capture video stream comprises a plurality of tracks, and wherein each of the plurality of tracks comprises audio data and video data that corresponds with a quality level.

20. The computer storage medium of claim 15, wherein the operations further comprise:
detecting that a stall in playback has occurred on the test device; and
creating a video stall indicator that provides an amount of stalls present in the screen-capture video stream.

* * * * *